United States Patent [19]
Knippel et al.

[11] Patent Number: 5,903,900
[45] Date of Patent: May 11, 1999

[54] METHOD AND APPARATUS FOR OPTIMIZING EXACT GARBAGE COLLECTION OF ARRAY NODES IN A CARDED HEAP

[75] Inventors: Ross C. Knippel, Half Moon Bay; Boris Beylin, Palo Alto, both of Calif.

[73] Assignee: Sun Microsystems, Inc., Palo Alto, Calif.

[21] Appl. No.: 08/842,139

[22] Filed: Apr. 23, 1997

[51] Int. Cl.$^6$ .................................................. G06F 17/30
[52] U.S. Cl. ........................... 707/206; 711/170; 711/171
[58] Field of Search .................................... 707/206, 103; 711/170, 171

[56] References Cited

U.S. PATENT DOCUMENTS

| | | | |
|---|---|---|---|
| 4,757,438 | 7/1988 | Thatte et al. | 364/200 |
| 4,775,932 | 10/1988 | Oxley et al. | 364/200 |
| 4,907,151 | 3/1990 | Bartlett | 364/200 |
| 4,920,483 | 4/1990 | Pogue et al. | 364/200 |
| 4,922,414 | 5/1990 | Halloway et al. | 364/200 |
| 4,989,134 | 1/1991 | Shaw | 364/200 |
| 5,088,036 | 2/1992 | Ellis et al. | 395/425 |
| 5,136,706 | 8/1992 | Courts | 395/600 |
| 5,218,698 | 6/1993 | Mandl | 395/600 |
| 5,222,221 | 6/1993 | Houri et al. | 395/375 |
| 5,241,673 | 8/1993 | Schelvis | 395/600 |
| 5,301,288 | 4/1994 | Newman et al. | 395/400 |
| 5,321,834 | 6/1994 | Weiser et al. | 395/600 |
| 5,355,483 | 10/1994 | Serlet | 395/650 |
| 5,367,685 | 11/1994 | Gosling | 395/700 |
| 5,408,650 | 4/1995 | Arsenault | 395/575 |
| 5,535,329 | 7/1996 | Hastings | 395/183.11 |
| 5,560,003 | 9/1996 | Nilsen et al. | 395/600 |
| 5,561,786 | 10/1996 | Morse | 395/497.01 |
| 5,566,321 | 10/1996 | Pase et al. | 395/480 |
| 5,652,883 | 7/1997 | Adcock | 395/622 |

OTHER PUBLICATIONS

Ladin et al. "Garbage Collection of a Distributed Heap" IEEE, pp. 708–715, Jan. 1992.

Diwan et al. "Memory System Performance of Programs with Intensive Heap Allocation" ACM Transactions on Computer Systems, vol. 13, No. 3, pp. 244–273, Aug. 1995.

Lins, R. D., "A Multi–processor Shared Memory Architecture for Parallel Cyclic Reference Counting," Microprocessing and Microprogramming, vol. 35, No. 1 / 05, Sep. 1, 1992, pp. 563–569.

Aho, et al., "compilers: Principles, Techniques and Tools," Addision–Wesley Publishing company, pp. 585–607, (1985).

Anderson, James R., "Simulation and Analysis of Barrier Synchronization Methods," University of Minnesota, Technical Report No. HPPC–95–04 (Aug. 1995).

Anderson, et al., "LockFree Transactions for Real Time Systems," in Real–time Database Systems: Issues and applications, Kluwer Academic Publishe, Norwell Massachusetts (1997).

Appleby, Karen, "Garbage Collection for Prolog Based on WAM," Communications of ACM, vol.31, Issue 6, pp. 1–20,(Jun. 1, 1988).

Baker, Henry G., Jr., "List Processing in Real Time on a Serial Computer," Comm. ACM, vol. 21, No. 4, pp. 280–294 (Apr. 1978).

(List continued on next page.)

*Primary Examiner*—Paul V. Kulik
*Assistant Examiner*—Michael J. Wallace, Jr.
*Attorney, Agent, or Firm*—Park & Vaughan

[57] ABSTRACT

Apparatus, methods, systems and computer program products are disclosed that optimize a programmed loop that stores pointer variables in an array in a card-marked heap. These methods also optimize garbage collection operations on these pointer variables. Instead of implementing a write-barrier in the body of a programmed loop, the loop is parameterized. This parameterization is associated with the pointer array stored in the heap. This parameterization specifies the first and last modified elements in the array. It further specifies the stride (which indicates how many elements are skipped to reach the next modified element of the array). The parameterization is modified by successive loops that access the array. During a garbage collection operation, the array's parameterization is used to optimize the process of locating modified elements in the array.

27 Claims, 29 Drawing Sheets

OTHER PUBLICATIONS

Barrett, David A., "Improving Performance of Conservative Generational Garbage Collection," Technical Report CU–CS–784–95, University of Colorado at Boulder (Sep. 1995).

Booch, Grady, "Object Oriented Design with Applications," The Benjamin/Cummings Publishing Company, Inc., pp. 26–71 (1991).

Bott, Ed, "Windows Invisble Wall: The 64K Barrier,"Windows Exam, pp. 210–212, (Mar. 1994).

Brooks, Roney A., "Trading Data Space for Reduced Time and Code Space in Real–Time Garbage Collection on Stock Hardware," in Conference Record of the 1984 ACM Symposium on Lisp and Functional Programming, Austin, Texas, pp. 256–262(1984).

Dawson, Jeffrey L. Imporved Effectiveness froma Real Time Lip Garbage Collector, Conference Record of the 1982 ACM Symposium on Lisp and Functional Programming, Pittsburgh, PA, pp. 159–167, (1982).

Dijkstra et al., "On–the–Fly Garbage Collection: An Exercise in Cooperation," Communications of the ACM, 21 (11), pp. 966–975 (1978).

Caro, Alejandro, "A Novel 64 Bit Data Representation for Garbage Collection and Synchronizing Memory," Computation Structures Group Memo 396, Massachusetts Institute of Technology,(Apr. 9, 1997).

Chandra, et al., "Scheduling and Page Migration for Multiprocessor Compute Servers," Proceedings of Architectural Support for Programming Languages and Operating Systems(1994).

Cohn, et al., Java Developer's Reference, pp. 1009–1010, Sams.net Publishing, (1996).

Courts, Robert, "Improving Locality of Reference in a Garbage Collecting Memory Management System," Communications of the ACM, vol. 31, No.9,pp. 1128–1138, (Sep. 1988).

Grehan, Rick "If Memory Serves . . . ," Byte, pp. 279–337, (Aug. 1989).

Grehan, Rick "Virtually Virtual Memory," Byte, pp. 455–464, (Sep. 1990).

Harbaugh, et al. "HeapGuard, Eliminating Garbage Collection in Real–Time Ada Systems," Integrated Software, Inc., pp. 704–708, (1995).

Holze, Urs, "A Fast Write Barrier for Generational Garbage Collectors," Presented at the OPPSLA '93 Garbage Collection Workshop, Washington, D.C., (Oct. 1993).

Hudson et al., "Incremental Collection of Mature Objects", International Workshop IWMM92, pp. 388–403, (Sep. 1992).

Imai, et al., "Evaluation of Parallel Copying Garbage Collection on a Shared–Memory Multiprocessor," IEEE Transaction on Parallel and Distributed Systems, vol. 4, No. 9 (Sep. 1993).

Jones, et al. "Garbage Collection: Algorithms for Automatic Dynamic Memory Management," John Wiley & Sons, Ltd., pp. 1–41,(1990).

Jones, et al. "Garbage Collection: Algorithms for Automatic Dynamic Memory Management," John Wiley & Sons, Ltd., pp. 1–226,(1996).

Kuechlin, et al. "On Multi–Threaded List Processing and Garbage Collection," Department of Computer and Information Science, Ohio State University, pp. 894–897,(1991).

Kung et al. "An Efficient Parallel Garbage Collection System and its Correctness Proof," IEEE Symposium on Foundations of Computer Science, pp. 120–131, (1977).

Moon, David A., Architecture of the Symbolics 3600, IEEE, pp. 76–83, (1985).

Moon, et al., "Garbage Collection in a Large Lisp System," Association for Computing Machinery (1984).

Muller, et al., Multitasking and Multithreading on an Multiprocessor with Virtual Shared Memory, Published in: Proceedings of the 2nd International Symposium on High–Performance Computer Architecture, Feb. 5–7, 1996 San Jose, California, pp. 212–221.

Pike, et al., "Process Sleep and Wakeup on a Shared–Memory Multiprocessor," Lucent Technologies (1995).

Plevyak, et al. "A Hybrid Execution Model for Fine–Grained Languages on Distributed Memory Multicomputers," The Association for Computing Machinery, Inc., (1995).

Shaw, Richard H., "An Introduction to the Win32 API," PC Magazine, vol. 13, No. 4, pp. 291–295, (Apr. 26, 1994).

Steele, Guy L.,Jr., Multiprocessing Compactifying Garbage Collection, Comm. ACM, vol. 18, No. 9, pp. 495–508, (Sep. 1975).

Ungar, David, "Generation Scavenging: a Non–disruptive High Performance Storage Reclamation Algorithm," ACM SIGPLAN Notices, vol. 19, No. 5, pp. 157–167 (May 1984).

Ungar et al. "An Adaptive Tenuring Policy for Generation Scavengers", ACM Transactionson Programming Languages and Systems, vol. 14, No. 1, pp. 1–27, (Jan. 1992).

Ungar et al. "Tenuring Policies for Generation–Based Storage Reclamation," ACM SIGPLAN Notices, vol. 23, No. 11, pp. 1–17 (1988).

van der Linden, Peter, "Not Just Java," pp. 156–165, Sun Microsystems, Inc., (1997).

Wallace, et al., "Simple Garbage Collection in G++," Cygnus Support, pp. 1–4.

Wilson, et al., "Dynamic Storage Allocation: A Survey and Critical Review," Department of Computer Sciences, University of Texas at Austin, pp. 1–78.

Wilson et al. "Design of the Opportunistic Garbage Collector," OOPSLA '89 Proceedings, pp. 23–35, (Oct. 1989).

Wolczko et al. "Multi–level Garbage Collection in a High–Performance Persisitent Object–System," Proceedings of the Fifth International Workshop on Persistent Object Systems, pp. 396–418, (Sep. 1992).

Yang, et al., "Fast, Scalable Synchronization with Minimal Hardware Support," Presendted at the Proceedings of the Seventh Annual ACM Symposium on Principles of Distributed Computing, ACM, New York, pp. 171–182, (Aug. 1993).

Yang et al., "A Fast, Scalable Mutual Exclusion Algorithm," Presented at the Twelfth Annual ACM Symposium on Principles of Distributed Computing, Ithica, New York, (Aug. 1993).

GC–FAQ–draft, 29 pages, http://www.centerfline.com/people/chase/GC/GC–faq.html.

Chung, Kin–Man and Yuen, Herbert, "A 'Tiny' Pascal Compiler: the P–Code Interpreter," Byte Publications, Inc., Sep. 1978.

Chung, Kin–Man and Yuen, Herbert, "A 'Tiny' Pascal Compiler: Part 2: The P–Compiler," Byte Publications, Inc., Sep. 1978.

Thompson, Ken, Regular Expression Search Algorithm, Communications of the ACM vol. II, No. 6, p. 149 et seq., Jun. 1968.

Mitchell, James G. Maybury, William, and Sweet, Richard, Mesa Language Manual, Xerox Corporation.

McDaniel, Gene, "An Analysis of a Mesa Instruction Set," Xerox Corporation, May 1982.

Pier, Kenneth A., "A Retrospective on the Dorado, A High–Performance Personal Computer," IEEE Conference Proceedings, The 10th Annual International Symposium on Computer Architecture, Aug. 1983.

METHOD AND APPARATUS FOR OPTIMIZING EXACT GARBAGE COLLECTION OF ARRAY NODES IN A CARDED HEAP

CROSS REFERENCE TO RELATED PATENT APPLICATIONS

This patent application is related to the following copending, commonly assigned patent applications, the disclosures of which are incorporated herein by reference in their entirety:

A METHOD AND APPARATUS FOR OPTIMIZING EXACT GARBAGE COLLECTION OF OBJECTS HAVING INTERMINGLED POINTER AND NON-POINTER VALUES, by: David M. Ungar and Mario I. Wolczko, filed concurrently herewith (filed Apr. 23, 1997).

A METHOD & APPARATUS FOR OPTIMIZING THE ASSIGNMENT OF HASH VALUES TO NODES RESIDING IN A GARBAGE COLLECTED HEAP, by: David C. Schwartz and David M. Ungar, filed concurrently herewith (filed Apr. 23, 1997).

A METHOD AND APPARATUS FOR OPTIMIZING EXACT GARBAGE COLLECTION USING A BIFURCATED DATA STRUCTURE, by: Mario I. Wolczko and David M. Ungar, filed concurrently herewith (filed Apr. 23, 1997).

A METHOD AND APPARATUS FOR REFERENCING NODES USING LINKS, by: David C. Schwartz and Mario I. Wolczko, filed concurrently herewith (filed Apr. 23, 1997).

A METHOD AND APPARATUS FOR LOCATING NODES IN A CARDED HEAP, by: Mario I. Wolczko and David M. Ungar, filed concurrently herewith (filed Apr. 23, 1997).

A METHOD AND APPARATUS FOR IMPLEMENTING A WRITE BARRIER OF A GARBAGE COLLECTED HEAP, by: David C. Schwartz and Ross C. Knippel, filed concurrently herewith (filed Apr. 23, 1997).

A METHOD AND APPARATUS FOR LOCALIZING NODES IN A GARBAGE COLLECTED CARDED HEAP, by: David C. Schwartz and Ross C. Knippel, filed concurrently herewith (filed Apr. 23, 1997).

BACKGROUND OF THE INVENTION

1. Field of the Invention

This invention relates to the fields of computer memory allocation and deallocation and compiler optimization. Specifically, this invention is a new and useful method, apparatus, system, and computer program product for automatic reclamation of memory storage when the storage is no longer used by an executing computer program; and an optimization performed by a compiler to improve the efficiency of programmed loops.

2. Background

Memory allocation and deallocation techniques have become very important in structured programming and object oriented programming methodologies. Memory allocated from a heap can be used to store information. Often this information is an instantiated object within an object-oriented paradigm. The subsequently described techniques apply to both nodes in the heap containing data and nodes in the heap that are instantiated objects.

Introduction to Garbage Collection

Computer memory is a resource. Programs cause a computer to perform operations (to execute) based on instructions stored in memory. Executing programs also use memory to store information. This information is often organized into memory resident data structures. Usually, these data structures are linked together by pointers from one structure to another referenced through pointers in static and stack variable storage. The memory resource is managed to meet the storage requirements for information and program code.

Executing programs often need memory for a purpose that extends for a limited period of time. For example, a program may allocate memory to hold information, store the information into the allocated memory, operate on the stored information to produce a result, and then have no further need of the stored information. Once the program no longer needs the stored information, the allocated memory can be released for later reuse.

Modern programming languages provide facilities for static, stack and heap allocation of memory. Static allocation binds variables to storage locations at compile and/or link time. Stack allocation pushes an activation frame on the computer stack when a program block prepares to execute. This activation frame contains storage for variables within the scope of execution for the program block. Once the program block completes, the activation frame is popped from stack. Thus, stacks store information in a last-in-first-out (LIFO) manner. Variables stored in the activation frame are not saved from one activation of the block to the next. Heap allocation allows memory for variables to be allocated and deallocated in any order and these variables can outlive the procedure (or block) that created them. Once memory is deallocated it is available for reallocation for another use.

A "node" is memory allocated from a heap. Nodes are accessed through pointers. A direct (or simple) pointer is the node's address in the heap. An indirect pointer (sometimes called a 'handle') points to an address in memory that contains the address of the node. More complex pointers exist. Indirect pointers allow nodes to be moved in the heap without needing to update the occurrences of the handle. One problem with indirect pointers is that they require an extra memory access to reach the node. This extra memory access slows execution of the program.

The "root set" is a set of node references such that the referenced nodes must be retained regardless of the state of the heap. A node is reachable if the node is in the root set, or referenced by a reachable node. The "reference set" is the set of node references contained in a node. A memory leak occurs when a node becomes unreachable from the root set and is never reclaimed. A memory leak reduces the amount of heap memory available to the program. A node that becomes unreachable from the root set and can be reclaimed is a garbage node.

Usage of heap memory can be accomplished by manually programming node allocation and deallocation. However, although a programmer knows when a new node is required, it is often difficult for the programmer to know when a node is no longer reachable. Thus, problems may occur when programmers explicitly deallocate nodes. One of these problems is that it is very difficult to debug memory leaks. Often the design of the application being programmed obfuscates when the programmer can explicitly deallocate memory. Additionally, when one portion of a program is ready to deallocate memory, it must be certain that no other portion of the program will use that memory. Thus, in object oriented programming (OOP) languages, multiple modules must closely cooperate in the memory management process. This, contrary to OOP programming methodology, leads to tight binding between supposedly independent modules.

These difficulties are minimized if the programmer need not explicitly deallocate memory. Automatic garbage collection methods scan memory for referenced nodes and recover garbage nodes—but at a cost. The process of finding and deallocating garbage nodes takes processor time. Balancing the impact of the garbage collection process on an executing program is important because the main function of the program may require timely operation or uninterrupted user interaction. Real-time systems (those systems that must provide a response within a specified clock time) often cannot dedicate large amounts of processor time to garbage collection. In real-time systems the garbage collection algorithm must be able to be interrupted.

In a system using garbage collection, nodes are allocated from the heap as memory is needed. These nodes are not initially reclaimed when they are no longer needed. Instead, when a memory allocation attempt fails or in response to some condition (for example on expiration of a clock), the garbage collection process is automatically invoked and unused memory is reclaimed for subsequent reuse.

Some garbage collection methods copy nodes (that is, these methods relocate nodes that appear to be alive from one location in the heap to another location). When this happens, a mechanism is required to allow existing pointers to the original location of the node to be used to access the relocated node. These mechanisms include (among others) updating existing pointers to the node's original location and providing indirect pointers to the new location of the node.

The prior art in garbage collection is well discussed in *Garbage Collection, Algorithms for Automatic Dynamic Memory Management,* by Richard Jones and Rafael Lins, John Wiley & Sons, ISBN 0-471-94148-4, copyright 1996 hereby incorporated by reference as indicative of the prior art.

Types of Garbage Collection Algorithms.

Garbage collection algorithms can be classified as 'exact' or 'conservative'. These exact algorithms operate by tracking variables that are known to contain pointers. These algorithms are often assisted by compiler modifications that help distinguish between pointers and data values. Often data values and pointer values are tagged to differentiate between them. The conservative algorithms do not receive any help from the compiler nor are the data values tagged. Thus, the garbage collection algorithms are unable to distinguish between data values and pointer values so that everything that looks like a pointer is treated as a pointer. Further, the conservative algorithms do not know the structure of the heap or the stack and do not expect pointers to be tagged. As such, the conservative algorithms must include steps for handling mis-identified pointers. Many garbage collection algorithms are a mixture of exact and conservative techniques.

Generational Garbage Collection

Generational garbage collection techniques use the observation that many nodes allocated from the heap are only used for a short period of time. These nodes are allocated for a specific short-term purpose, used for the purpose, and then can be deallocated for possible later reuse. Thus, garbage collection algorithms that concentrate on younger nodes are more efficient than those that process all nodes identically because fewer nodes need to be examined during the garbage collection process.

Generational Garbage Collection algorithms separate nodes into two or more areas in the heap depending on the node's age. Each area is a generation. Nodes are first allocated from the creation area within the youngest generation and are copied to the older generation if the node survives long enough ("long enough" is often until the next scavenge operation). These garbage collection algorithms concentrate on reclaiming storage from youngest generation area where most of the garbage is found. Generally, the number of live nodes in the youngest generation is significantly less than the number of live nodes in the other generation areas so that the time required to scavenge nodes in the youngest generation is less than the time required to scavenge the other generation areas. A scavenge operation of the creation area is termed a minor collection. Any garbage collection operation on an older generation area is termed a major collection. The minor collection operation occurs more frequently than the major collection operation because of the reduced overhead and higher efficiency of the minor collection process.

However, generational garbage collection algorithms need to record inter-generational pointers. These inter-generational pointers are created (1) by storing a pointer in a node or (2) when a node containing a pointer is copied to an older generation area. The pointers created by a copying algorithm can be recognized by the copying algorithm. A write-barrier is used to record pointers created by an assignment of a pointer within a node. If all younger generation areas are collected whenever an older generation area is collected, the write-barrier only need record pointers from the older generation area to the younger generation area.

Even though a minor collection operation is faster than a major collection operation, the minor collection operation often requires too much time to be satisfactory in a real-time situation. Thus, the minor collection process must be interrupted to meet real-time requirements. One difficulty with interrupting the minor collection is that the inter-nodal pointers are left in an indeterminate state such that some inter-nodal pointers point to the promoted node and others point to the original node. That is, when the minor collection operation is interrupted after a node is copied, often not all the references to the node's prior location are updated to the new location of the node.

Once a node is copied, any pointers to the copied node must be updated or tracked so that future references to the copied node eventually succeed. Further, pointers to nodes in the younger generation contained in copied nodes must be accessed to determine the reference set.

FIG. 1a illustrates a heap area indicated by general reference character 100. The heap area 100 includes a generational garbage collection area 101. The generational garbage collection area 101 includes a younger generation 103 and an older generation area 105. The younger generation 103 is often subdivided into a creation area 107, a 'to' area 109, and a 'from' area 111. Nodes (such as a new node 113) are first created in the creation area 107. When the creation area 107 fills, the meaning of the 'to' area 109 and the 'from' area 111 are interchanged. Then, active nodes, such as the new node 113, along with active nodes in the 'from' area 111 are copied to the 'to' area 109. Active nodes in the 'to' area 109 are copied to the older generation area 105 when the 'to' area 109 fills. This results in a promoted node 115 in the older generation area 105. One skilled in the art will understand that other generational implementations exist. Further one skilled in the art will understand that the creation area 107 contains the youngest nodes.

Card marking

The process to determine the root set often takes significant processor time searching for pointers in the heap. One optimization used in the prior art is to segment the heap into equal size areas (called cards) and to mark each card when a write operation occurs within the card—a form of a write-barrier. Thus, only cards marked as 'dirty' (instead of all the cards in the heap memory) are searched for pointers when updating the root set. FIG. 1b illustrates the use of card marking. A general reference character 120 illustrates a card-marked region of memory 121. The card-marked region of memory 121 contains a first card 123 and a second card 125. In this illustration, the first card 123 is adjacent in memory to the second card 125. Thus a plurality of nodes (A–F) 127 are distributed over the first card 123 and the second card 125. The first card 123 is associated with a first card marker 129 and the second card 125 is associated with a second card marker 131. When memory is modified in one of the cards 123, 125, the appropriate card marker is flagged. Thus, in the illustration of FIG. 1b, a write operation was performed within the first card 123 resulting in the first card marker 129 being marked 'dirty' as indicated by the 'X' in the first card marker 129. The fact that the second card marker 131 is not marked indicates that none of the memory in the second card 125 has been modified since the last scavenge. The fact that a node 'D' 133 extends across the boundary between the first card 123 and the second card 125 complicates the ability to detect the start of the node. Generally, card markers are initialized to all ones (FF hex) because the computer's memory-clear operation is often faster than a store-value operation.

When using card marking, it is often necessary to find the start of a node given a pointer to an address within the interior of the node or an index to a card. This is typically done in the prior art by scanning backwards in memory from the initial pointer (or start of a card) looking for the node's header. However, with programming language implementations that do not differentiate or tag integers, object headers and pointers, scanning backwards does not work due to the inability to detect the start of the node.

Another goal of card marking, when used with a generational garbage collection algorithm, is to skip over objects in the copied generation area of the heap that do not reference objects in the creation area of the heap. However, this goal is lost if the density of such nodes in the older generation is such that most cards are marked. FIG. 1c illustrates this problem of the prior art with a 'card marking structure' as indicated by general reference character 140. A 'younger area of the heap' 141 contains at least one node 143, 145, 147. An 'older generation area of the heap' 149 is segmented into a plurality of cards 151, 153. The card 151 is associated with a 'card marker' 155 and the card 153 is associated with a 'card marker' 157. A 'card boundary' 159 indicates the ending of the card 151 and the beginning of the card 153. The 'older generation area of the heap' 149 contains a 'number of nodes (A–F)' 161 including a 'node E' 163 and a 'node C' 165. The 'node E' 163 includes a pointer to the node 145 and the 'node C' 165 includes a pointer to the node 143 both in the 'younger area of the heap' 141. Because a node in the card 151 references the 'younger area of the heap' 141 the 'card marker' 155 is marked. Because a node in the card 153 references the 'younger area of the heap' 141 the 'card marker' 157 is marked. Thus, even using card marking, each node in the 'older generation area of the heap' 149 must be checked for pointers to the 'younger area of the heap' 141. This eliminated the advantage sought by using card marking.

Another problem with cardmarking is that the operation of scanning the card indicators to find the marked cards is an overhead operation because a large number of memory locations (those containing the marking vector) must be examined to locate the marked cards.

A card marking implementation is described in *A Fast Write Barrier for Generational Garbage Collectors* by Urs Hölzle, presented at the OOPSLA'93 Garbage Collection Workshop in Washington D.C. in October 1993. This paper is included by reference as illustrative of the prior art and can be found on the internet at:

"http://self.sunlabs.com/papers/write-barrier.html".

Object Oriented Programming

Object oriented programming (OOP) is a methodology for building computer software. Key OOP concepts include data encapsulation, inheritance and polymorphism. While these three key concepts are common to OOP languages, most OOP languages implement the three key concepts differently. Objects contain data and methods. Methods are procedures that generally access the object's data. The programmer using the object does not need to be concerned with the type of data in the object; rather, the programmer need only be concerned with creating the correct sequence of method invocations and using the correct method.

Smalltalk, Java and C++ are examples of OOP languages. Smalltalk was developed in the Learning Research Group at Xerox's Palo Alto Research Center (PARC) in the early 1970s. C++ was developed by Bjarne Stroustrup at the AT&T Bell Laboratories in 1983 as an extension of C. Java is a OOP language with elements from C and C++ and includes highly tuned libraries for the internet environment. It was developed at SUN Microsystems and released in 1995.

In an OOP system, objects hide (encapsulate) the internal structure of their data and the algorithms used by their methods. Instead of exposing these implementation details, well-designed OOP objects present interfaces that represent their abstractions cleanly with no extraneous information. Polymorphism takes encapsulation a step further. A software component can invoke a method in an OOP object without knowing exact details about how the method operates. Thus a software component can invoke the 'draw' method for a square object and a circle object and the objects respectively draw a square and a circle. Inheritance allows developers to reuse pre-existing design and code and reduces the need for developers to create software from scratch. Rather, through inheritance, developers derive subclasses that inherit behaviors from existing OOP objects, that the developer then customizes to meet their particular needs.

Objects

Objects are instantiated in the heap based on classes that contain the programmed methods for the object. Instantiated objects contain data (in instance variables) specific to that particular instantiated object. Generally, an object based on a class is instantiated (or constructed) when a node with memory for the object is allocated from the heap, the required information to tie the object to the class is stored in the object, the object is also associated with other objects as appropriate and the object's instance variables initialized. FIG. 1d illustrates the conceptual aspects of an instantiated object as indicated by general reference character 170. The instantiated object 170 contains an object header 171, a base-class variable storage 173, a first subclass variable storage 175, a second subclass variable storage 177 and a final subclass variable storage 179 for the $n^{th}$ subclass. The object header 171 contains or refers to information (as indicated by a block 181) that supports the instantiated object 170. The information in the object header 171 often includes a pointer to a class definition and, either directly or indirectly, an instance-variable count. The base-class variable storage 173, and the first subclass variable storage 175 each include instance variables as indicated by a block 183 associated with the second subclass variable storage 177. The instance variables in the block 183 include intermixed pointer and data variables. One difficulty with the organization of information in the instantiated object 170 is that the data value and pointer instance variables can not be distinguished simply by examination of the information stored in the instance variables. Hence, determining the pointers into the heap for garbage collection is inefficient. This inefficiency has led many object-oriented language implementations to sacrifice data value precision and to tag each value to distinguish a pointer value from a data value. Another common approach provides a tag table that associates a tag for each variable defined in the class. The tag indicates whether the instance variable of an instantiated object of the class contains a data value or a pointer value. Using a tag table increases computational overhead because the tag table must be checked for each instance variable when determining the live nodes in the heap. One skilled in the art will understand that pointers may be either direct or indirect.

As previously discussed, objects are allocated from the heap. Thus, objects are a special case of nodes. Further, many OOP implementations assign a 'hash value' to objects and provide methods to access this hash value. The hash value is a useful quasi-unique integer associated with a node in the heap. Determining this hash value and storing it in the object when that object is short lived (hence only existent in the heap for a limited period of time) is unnecessary overhead. One prior art method used to reduce this burden is to only generate the hash value when it is requested. Thus a counter containing the next hash value is accessed to get the hash value, the hash value is stored in the node, and the counter incremented requiring one memory read and two memory-write operations.

Further information about OOP concepts may be found in *Object Oriented Design with Applications* by Grady Booch, the Benjamin/Cummings Publishing Co., Inc., Redwood City, Calif., (1991), ISBN 0-8053-0091-0.

Compilers, Virtual Machines (Interpreters) and Machines

Programming languages allow a programmer to use a symbolic textual representation (the source code) representing the operations that an application binary interface (ABI) (such as a computer or an interpreter running on a computer) is to perform. This symbolic representation is converted into opcodes understood by the ABI. Usually these opcodes are binary values. By processing the source code, compilers create an object file (or object module) containing the opcodes corresponding to the source code. (One skilled in the art will understand that the terms 'object file' and 'object module' are not related to the 'OOP object' previously discussed.) This object module, when linked to other object modules, results in executable instructions that can be loaded into a computer's memory and run by the ABI.

An interpreter is a program that executes on a computer that accesses opcodes and causes the computer to perform one or more operations that effectuate the operation specified by the opcode. Thus, an interpreter can be thought of as a program that provides a virtual computer environment or virtual machine—the ABI. Any computer that is able to execute the interpreter is able to execute programs compiled for the ABI. Thus, the same program's opcodes can be downloaded over a network and executed on a variety of different computer architectures that implement the ABI.

A program's source consists of an ordered grouping of strings (statements) that are converted into both opcodes and data suitable for execution by the execution environment. A source program provides a symbolic description of the operations that the ABI will perform when executing the opcodes resulting from compilation and linkage of the source. The conversion from source to opcodes is performed according to the grammatical and syntactical rules of the programming language used to write the source.

Each compiled statement can produce a multitude of opcodes that, according to the ABI, implement the operation described by the symbolic statement. A compiler may significantly change the structural organization represented by the source when producing the compiled opcodes. However, no matter how much the compiler changes this organization, the compiler is restricted in that the opcodes, when run by the ABI, must provide the same result as the programmer described using the source language—regardless of how this result is obtained. Similarly, the order in which data is stored in the structure need not be the same order as implied by the sequence of variable declarations supplied by the programmer. For example, the actual placement of instance variables in an instantiated object need not be in the same order as the variables were defined in the class declaration.

Many modern compilers can optimize the binary opcodes resulting from the compilation process. Due to the design of programming languages, a compiler can determine structural information about the program being compiled. This information can be used by the compiler to generate different versions of the sequence of opcodes that perform the same operation. (For example, enabling debugging capability, or optimizing instructions dependent on which version of the target processor for which the source code is compiled.) Some optimizations minimize the amount of memory required to hold the instructions; other optimizations reduce the time required to execute the instructions.

Some advantages of optimization are that the optimizing compiler frees the programmer from the time consuming task of manually tuning the source code. This increases programmer productivity. Optimizing compilers also encourage a programmer to write maintainable code because manual tuning often makes the source code less understandable to other programmers. Finally, an optimizing compiler improves portability of code because source code tuned to one computer architecture may be inefficient on another computer architecture. A general discussion of optimizing compilers and the related techniques used can be found in *Compilers: Principles, Techniques and Tools* by Alfred V. Aho, Ravi Sethi and Jeffrey D. Ullman, Addison-Wesley Publishing Co. 1988, ISBN 0-201-10088-6, in particular chapters 9 and 10, pages 513–723.

One programming construct that can be significantly optimized are loops. Loops often iterate using a loop-control variable. The loop-control variable is initialized to a starting value for the first iteration of the loop. The loop-control variable is modified by a stride value on each iteration of the body of the loop until the loop-control variable reaches a last value. The loop completes when the loop-control variable reaches the last value. Such loops are often used to assign values to elements of an array of pointers (for example, an array of pointers to OOP objects). For applications using card marking or other write-barrier methods this means that the write-barrier instructions are also repeatedly executed in the body of the loop. Thus, a loop is inefficient if that loop assigns values to elements in a pointer array in a heap that uses a write-barrier.

SUMMARY OF THE INVENTION

The present invention provides an economical, apparatus, method, system and computer program product for optimizing a garbage collection operation on a plurality of pointer values in a pointer array in a card-marked heap. The pointer array has a plurality of elements. One aspect of the invention is a computer controlled method that includes the steps of parameterizing the pointer array dependent on a programmed loop operation and results in a pointer data parameterization. The pointer data parameterization specifies a pattern of pointer assignments that is associated with the pointer array. The method also includes the step of storing the plurality of pointer values into the plurality of elements. This step occurs within the programmed loop operation. However, this step does not mark the card-marked heap within the programmed loop operation. The method also includes the step of optimizing the garbage collection operation on the plurality of elements dependent on the pointer data parameterization.

Another aspect of the invention is an apparatus including a central processing unit coupled to a memory. The apparatus optimizes a garbage collection operation on a plurality of pointer values in a pointer array. The pointer array is stored in a card-marked heap in the memory. The pointer array has a plurality of elements. The apparatus includes a parameterization mechanism that is configured to parameterize the pointer array dependent on a programmed loop operation resulting in a pointer data parameterization. The pointer data parameterization specifies a pattern of pointer assignments associated with the pointer array. The apparatus also includes a storage mechanism within the programmed loop operation that is configured to store the plurality of pointer values into the plurality of elements. The storage mechanism does not mark the card-marked heap within the programmed loop operation. The mechanism also includes an optimization mechanism configured to optimize the garbage collection operation on the plurality of elements. This optimization is dependent on the pointer data parameterization.

Yet a further aspect of the invention is a computer program product embedded on a computer usable medium for causing a computer to optimize a garbage collection operation on a plurality of pointer values in a pointer array. When executed on a computer, the computer readable code causes a computer to effect a parameterization mechanism, a storage mechanism and an optimization mechanism. Each of these mechanisms having the same functions as the corresponding mechanisms for the previously described apparatus.

Another aspect of the invention is a computer controlled method for optimizing an assignment operation within a programmed loop operation. The assignment operation is to a plurality of elements in a pointer array in a card-marked heap. This method includes the step of parameterizing the pointer array. This parameterization is dependent on a programmed loop operation (characterized by a current pointer data parameterization) and existing pointer data parameterization that is associated with the pointer array. The step or parameterizing the pointer array results in a modified pointer data parameterization that is associate with the pointer array. The method additionally includes the step of storing (in the programmed loop operation) the plurality of pointer values into the plurality of elements without marking the card marked heap within the programmed loop operation.

Another aspect of the invention is an apparatus having a central processing unit coupled to a memory. This apparatus optimizes an assignment operation, within a programmed loop operation, to a plurality of elements in a pointer array. The pointer array being in a card-marked heap in the memory. The apparatus includes a parameterizing mechanism that is configured to parameterize the pointer array. This parameterizing mechanism is dependent on a programmed loop operation that is characterized by a current pointer data parameterization and an existing pointer data parameterization. The existing pointer data parameterization is associated with the pointer array. The result of the parameterizing mechanism is a modified pointer data parameterization associated with the pointer array. The apparatus also includes a storage mechanism, within the programmed loop operation, that is configured to store the plurality of pointer values into the plurality of elements. This storage mechanism operations without marking the card-marked heap when within the programmed loop operation.

Yet a further aspect of the invention is a computer program product embedded on a computer usable medium for causing a computer to optimize an assignment operation within a programmed loop operation. When executed on a computer, the computer readable code causes a computer to effect a parameterizing mechanism and a storage mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1A:
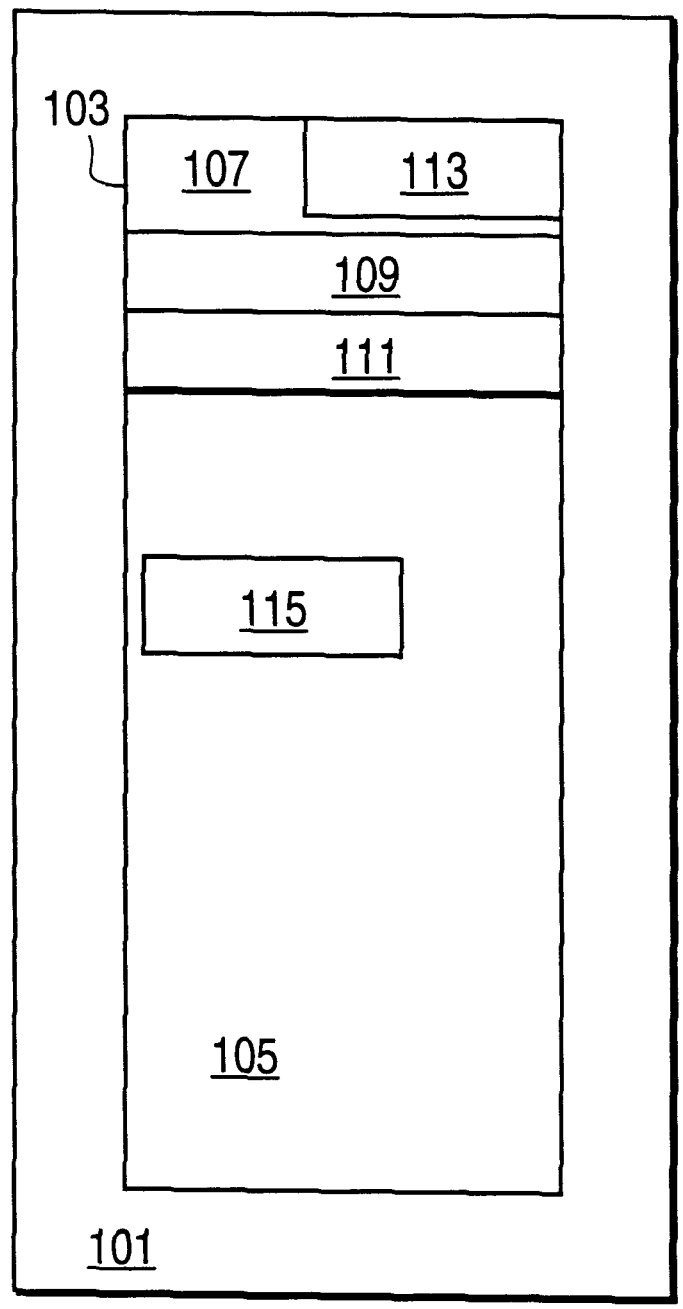
FIG. 1a illustrates a heap area including a generational garbage collection area.
Figure 1B:
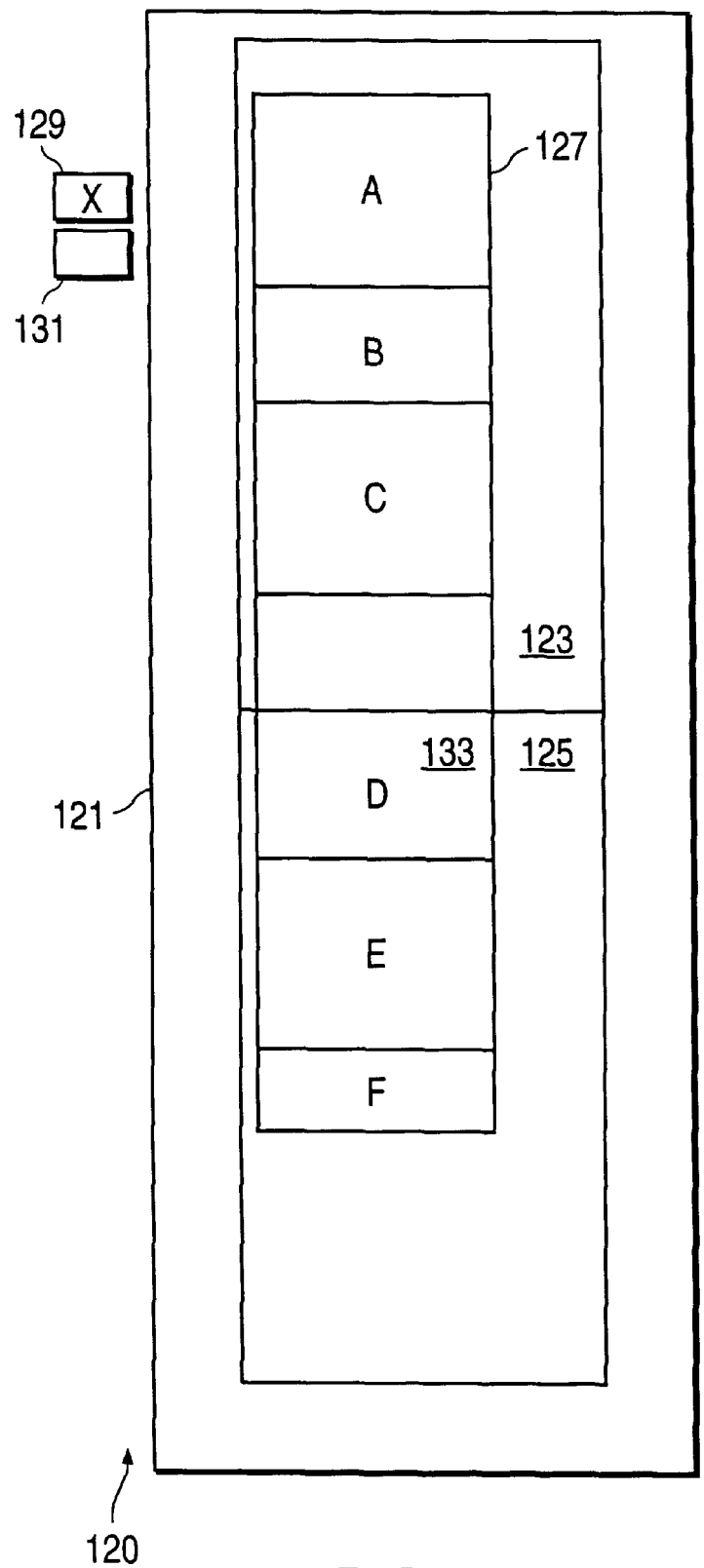
FIG. 1b illustrates the use of card marking.

The following 'notations and nomenclature' are provided to assist in the understanding of the present invention and the preferred embodiments thereof.

Node—An area of memory allocated from the heap.

Object—An instantiated object resides in a node. It generally contains instance variables and a pointer to a class that references the object's methods.

Pointer—A value used as an address to a node. By locating pointers to nodes a garbage collection algorithm determines which nodes are live.

Link—A pointer equivalent comprised of an offset into the creation area and a validation value that associates the link with a pointer.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

One skilled in the art will understand that, although the figures and illustrations use a particular bit ordering within the computer memory word, the actual bit ordering is irrelevant to the invention. Further, one skilled in the art will understand that illustrations of data structures in memory start at the lower addressed memory at the top of the structure and extend to higher addressed memory.

Operating Environment

Figure 2:
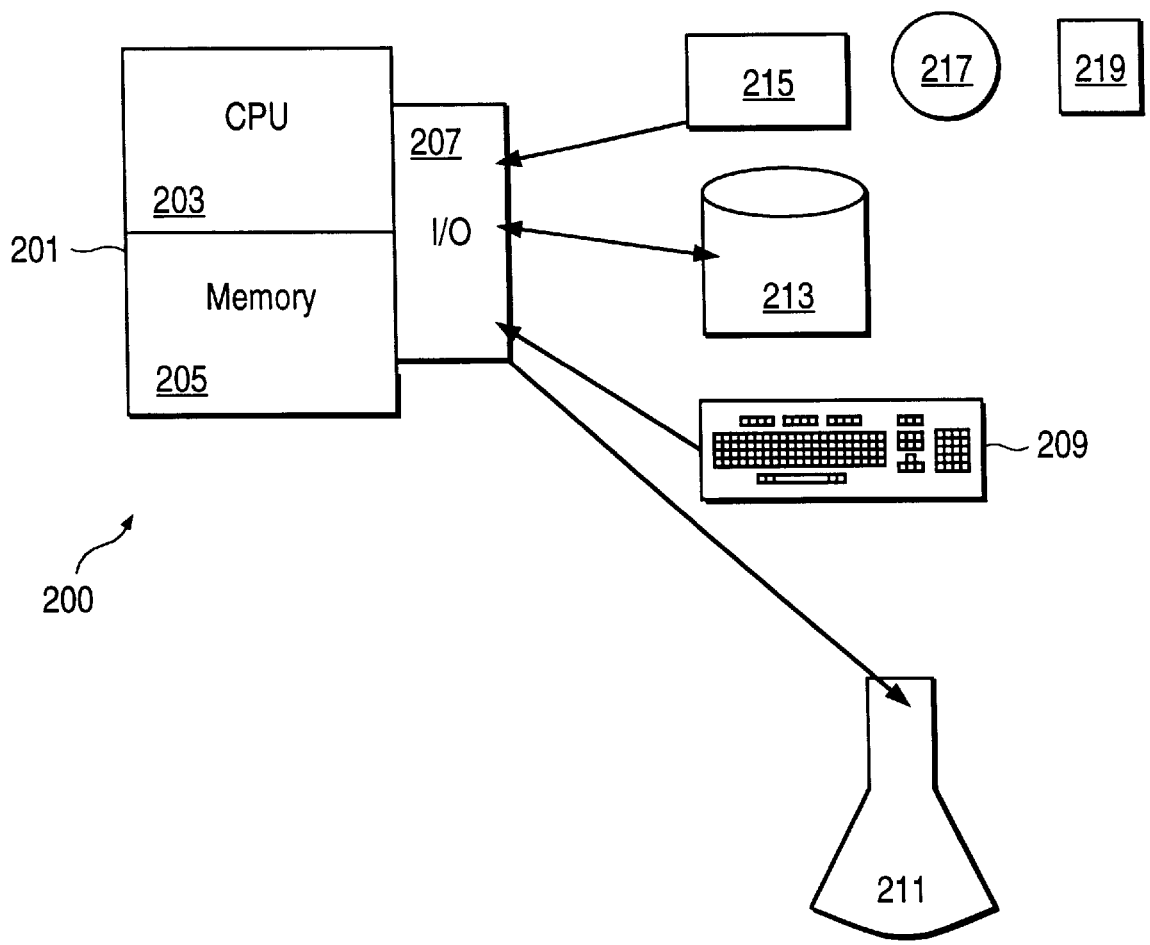
FIG. 2 illustrates a computer system capable of using the data structures to locate pointers in accordance with an embodiment of the present invention.

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. A CD-ROM drive unit 215, along with the CD-ROM medium 217, and the disk storage unit 213 comprise a filestorage mechanism. Such a computer system is capable of executing applications that embody the invention.

Exact garbage collection algorithms must distinguish between values that are pointers and values that are non-pointers. Once the pointer values are located, allocated nodes can be found in the heap. Areas of the heap that are not referenced by these pointers are garbage and can be reclaimed by a scavenge operation. Locating the pointer values takes computer resources and so more efficient mechanisms are advantageous.

One aspect of the invention is a bifurcated data structure that separates pointer values from data values. This type of data structure, when used as an instantiated object, facilitates efficient locating of pointer values in the data structures.

Figure 3A:
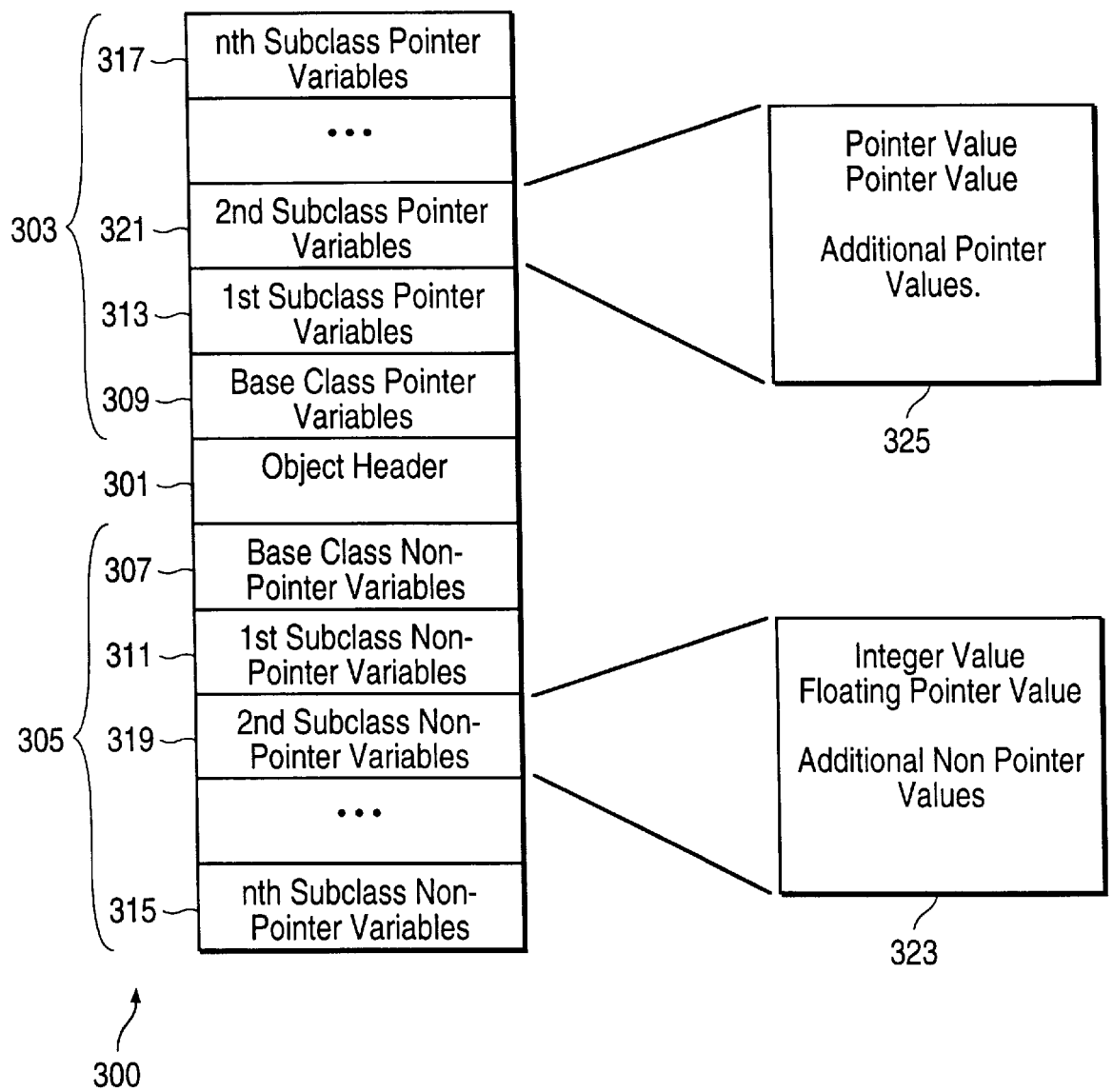
FIG. 3a illustrates an instantiated object data structure in accordance with an embodiment of the present invention.

FIG. 3a illustrates an instantiated object data structure, indicated by general reference character 300, in memory that separates pointer values from data values in the instantiated object data structure 300. In FIG. 3a, and in all other figures containing data structures, memory addresses increase moving down the structure. The instantiated object data structure 300 is derived from a class (not shown). An object header structure 301 is placed in the body of the instantiated object data structure 300. The object header structure 301 is constructed so that the first word of the object header structure 301 is distinguishable from a pointer (for example, this header value having the least significant bit of the word set to one). A pointer memory area 303 is located before the object header structure 301. The pointer memory area 303 contains the pointer values used by the instantiated object data structure 300. A data value memory area 305 is located after the object header structure 301 and contains the non-pointer data values used by the object. The object header structure 301 also contains or references a size field (not shown) that contains, or can be used to derive the size of the data value memory area 305. In FIG. 3a the instantiated object data structure 300 has inherited from a subclass of a subclass. The base-class instance variables are arranged closest to the object header structure 301. A base-class non-pointer instance variable area 307 is used to store non-pointer data values for the base-class of the instantiated object data structure 300. A base-class pointer instance variable area 309 is used to store pointer values for the base-class of the instantiated object data structure 300 such as a pointer to a table of method procedure addresses or pointers to other nodes in the heap. In a similar manner a first subclass non-pointer instance variable area 311 and a first subclass pointer instance variable area 313 respectively store non-pointer and pointer variable data for the first subclass of the base-class. Similarly for an $n^{th}$ subclass non-pointer instance variable area 315 and an $n^{th}$ subclass pointer instance variable area 317. This separation between pointer and non-pointer data is further indicated by a second subclass non-pointer instance variable area 319 and a second subclass pointer instance variable area 321 resulting from the second subclass definition. A detailed data value allocation 323 illustrates non-pointer data value storage and a detailed pointer value allocation 325 illustrates pointer data value storage. Thus the process of determining pointers into the heap by locating pointer variables is simplified by the separation of pointer values and data values in the instantiated object data structure 300.

Those skilled in the art will understand that some compilers may need to be modified to produce the object structure disclosed above. Further, they will understand that the object is just a special use of a data structure and the underlying concept of the previously described data structure is to store pointers prior to a distinguishable data structure header to facilitate the determination of the pointer instance variables. Additionally, they will understand that the separation of the pointer memory area 303 and the data value memory area 305 in the instantiated object data structure 300 means that the position of an instance variable in the data value memory area 305 with respect to the object header structure 301 remains constant for all instantiated objects based on subclasses of the original class. This invariance simplifies interpretation of the objects. For implementations with compiled code, this invariance saves space by allowing code compiled for a superclass to be reused for instances of a subclass of the super class.

Figure 3B:
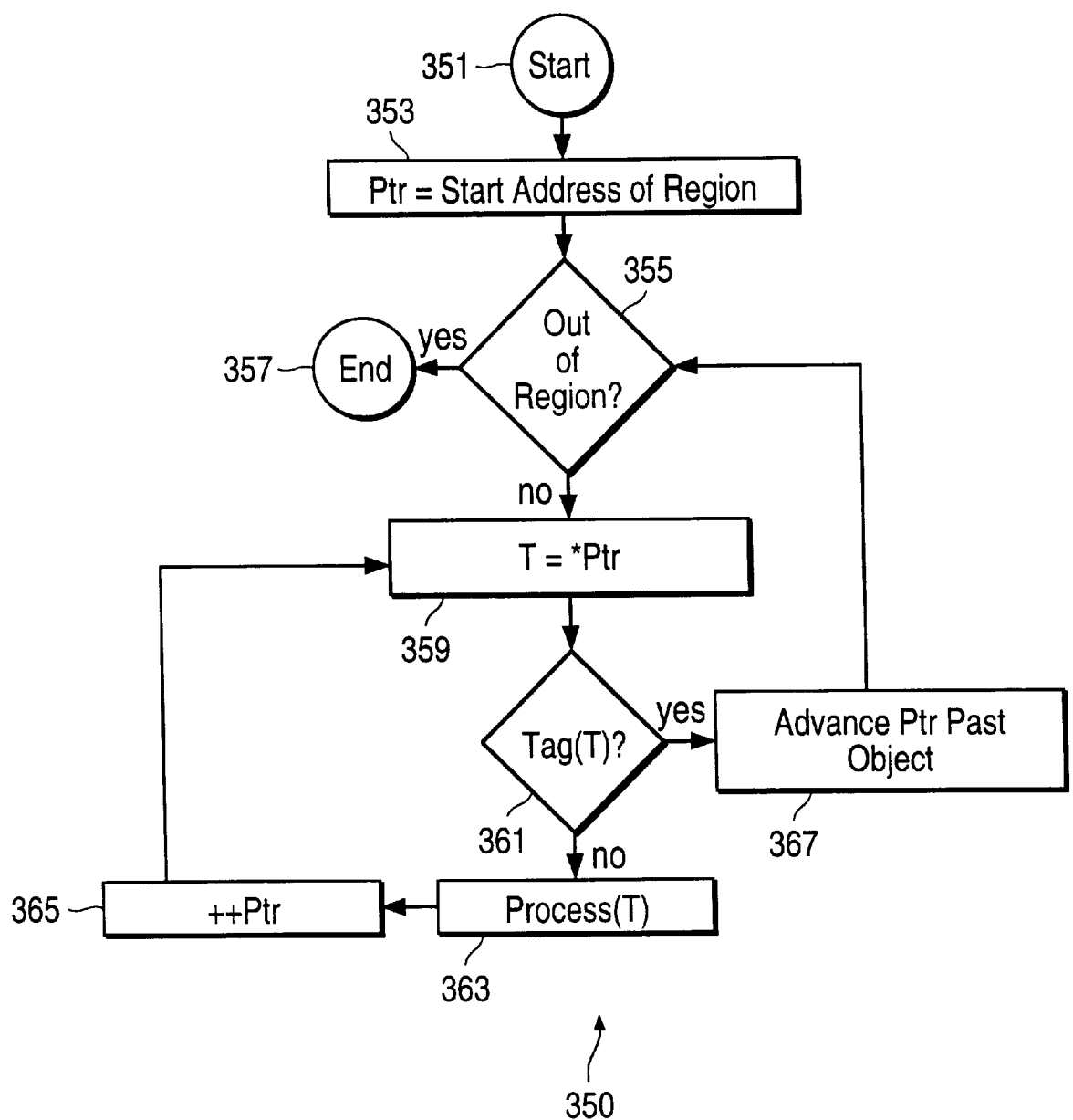
FIG. 3b illustrates a process used to gather pointer values residing in a contiguous region of memory in accordance with an embodiment of the present invention.

FIG. 3b illustrates a process, as indicated by a general reference character 350, used to gather pointer values residing in a contiguous region of memory. These values are used for subsequent garbage collection processing. The process 350 initiates at a 'start' terminal 351 and continues to a 'get address of region' procedure 353. The 'get address of region' procedure 353 obtains the address of the region being scanned for pointers and stores this address in Ptr. This memory region starts with the pointer memory area 303 of the first object in the region. Next, an 'out-of-region' decision procedure 355 determines whether the Ptr has advanced past the end of the region. If the Ptr has advanced past the end of the region, the process 350 completes through an 'end' terminal 357. Otherwise the process 350 continues to a 'set 'T' to value pointed to by Ptr' procedure 359 that stores the value of the location pointed to by Ptr into 'T'. Next, at a 'check 'T' for tag' decision procedure 361, the process 350 determines whether the value in 'T' is a pointer or the first word of the object header structure 301. In one preferred embodiment, this determination is made by checking the lower order bits of the value to distinguish between the pointer values in the pointer memory area 303 and the first word of the object header structure 301. If the 'check 'T' for tag' decision procedure 361 determines that the value in 'T' is a pointer value, the process 350 continues to a 'process 'T'' procedure 363 that records the value stored in 'T' as a pointer for subsequent processing by the garbage collection process or immediately applies the garbage collection process to the pointer depending on the embodiment. The process 350, at an 'advance Ptr' procedure 365, then advances Ptr to point to the next location in the object. The process 350 then loops back to the 'set 'T' to value pointed to by Ptr' procedure 359 to continue recording pointers in the pointer memory area 303. However, if the 'check 'T' for tag' decision procedure 361 determines that the value in 'T' is not a pointer (that is, that the value in 'T' is the first word of the object header structure 301) the process 350 continues to an 'advance pointer past object' procedure 367. The 'advance pointer past object' procedure 367 advances the Ptr past the data value memory area 305 and the rest of the object header structure 301 using methods well understood in the art.

One skilled in the art will understand that although the previous data structure and process were described in the context of scanning for pointers in a region of memory, that one embodiment follows nodes related to each other by pointers and scans the pointer memory area 303 of each related node.

One skilled in the art will also understand that many techniques exist to advance to the next object and to add pointers to the reference set. Further, one skilled in the art will understand that an object is a special use of a data structure and that the techniques described above also apply to generalized data structures in memory.

Figure 4A:
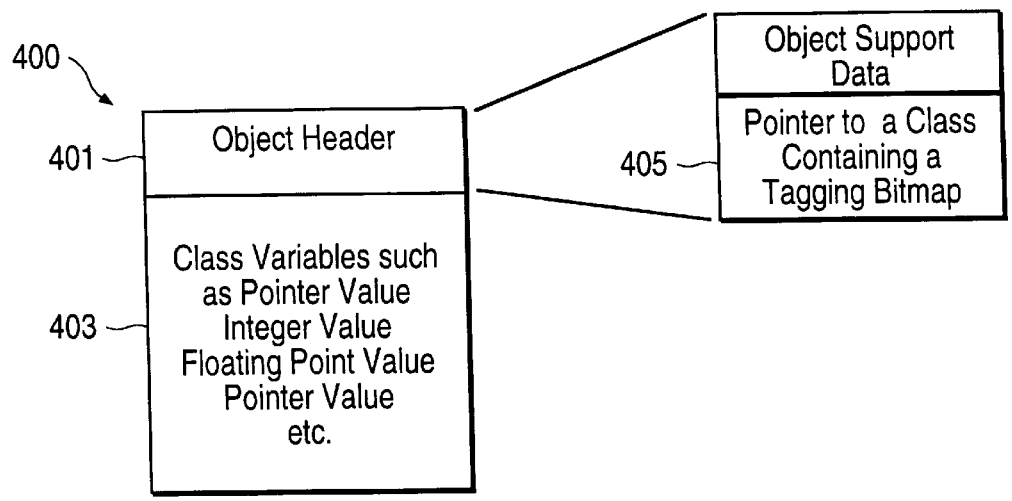
FIG. 4a illustrates an instantiated object data structure similar to the instantiated object of FIG. 1d in accordance with an embodiment of the present invention.

Another embodiment of the invention improves computational efficiency when determining the reference set of an object by optimizing the gathering of pointer values that are intermixed with data values in the instantiated object—that is, for data structures that are not bifurcated. FIG. 4a illustrates an instantiated object data structure, shown by general reference character 400, similar to the instantiated object 170 of FIG. 1d. The instantiated object data structure 400 includes an object header structure 401 and an instance variable storage area 403. The object header structure 401 includes a class pointer 405 that points to a class that includes a tagging bitmap, as indicated by general reference character 430.

Figure 4B:
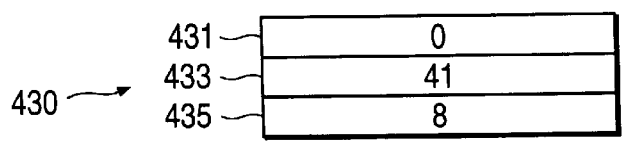
FIG. 4b illustrates a tagging bitmap included in a class in accordance with an embodiment of the present invention.

FIG. 4b illustrates the tagging bitmap 430 included in the class. The tagging bitmap 430 is a sequential byte array. Each byte distinguishes pointer and non-pointer values for eight sequential locations in the instance variable storage area 403 for the instantiated object data structure 400. There are 256 possible values that can be contained in a byte. The values in the tagging bitmap 430 serve as an index into a table of 256 routine addresses as is subsequently described. These values also represent patterns of pointer and non-pointer instance variables for eight consecutive instance variables in the instance variable storage area 403. For example, assuming the instance variable storage area 403 contains twenty values, the tagging bitmap 430 would contain three entries: a first entry 431, a second entry 433, and a third entry 435. Further assuming that the ninth, fifteenth and twentieth values in the instance variable storage area 403 are pointer values, the value of the first entry 431 would be zero, the value of the second entry 433 would be 41(hex), and the value of the third entry 435 would be 08(hex).

Figure 4C:
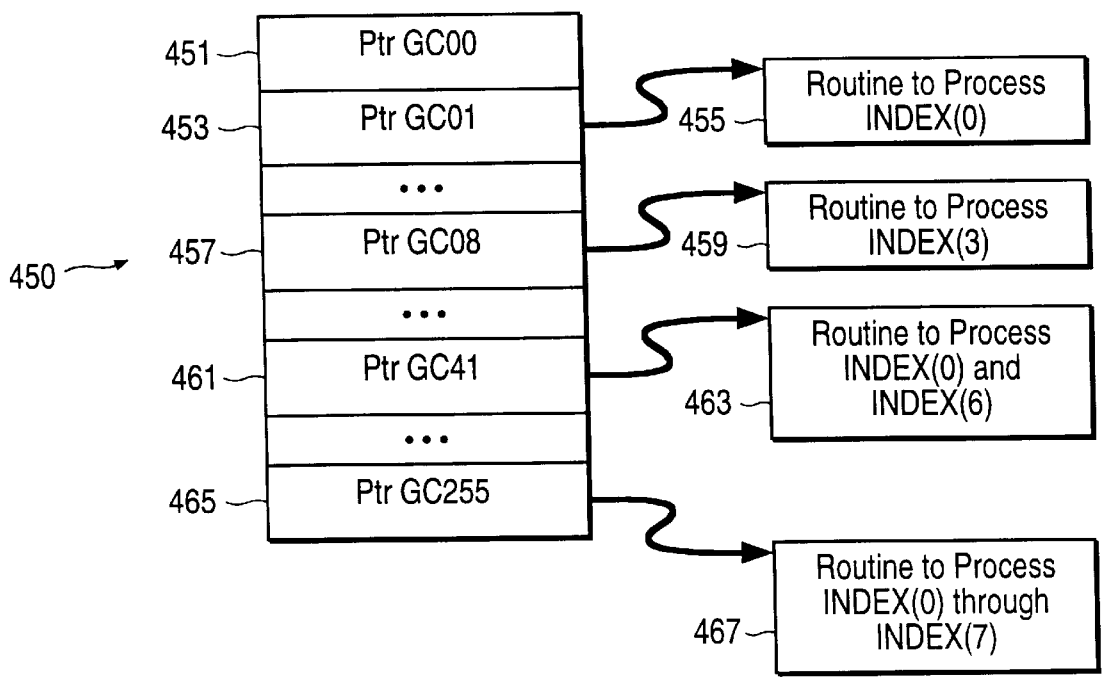
FIG. 4c illustrates a routine dispatch table in accordance with an embodiment of the present invention.

FIG. 4c illustrates a routine dispatch table as indicated by general reference character 450. The routine dispatch table 450 contains pointers, handles, or similar means to invoke called routines. When invoked, each called routine receives, as an argument, a pointer to the current variable in the instance variable storage area 403. A first entry 451 in the routine dispatch table 450 contains a pointer to a procedure that does not process any instance variables in the instance variable storage area 403. The first entry 451 corresponds to an entry in the tagging bitmap 430 that indicates no pointers in the next eight variables of the instance variable storage area 403. A second entry 453 in the routine dispatch table 450 contains a pointer to a called routine to process INDEX (0) 455. This called routine 455 processes only the variable in the instance variable storage area 403 pointed to by the passed argument. A third entry 457 in the routine dispatch table 450 contains a pointer to a called routine to process INDEX(3) 459 that only processes the third instance variable beyond the one pointed to by the passed argument. A fourth entry 461 in the routine dispatch table 450 contains a pointer to a called routine to process INDEX(0) and INDEX (6) 463. This routine 463 processes both the variable pointed to by the passed argument and the sixth variable past the variable pointed to by the passed argument. Finally, a fifth entry 465 in the routine dispatch table 450 contains a pointer to a called routine to process INDEX(0) through INDEX(7) 467. This routine 467 processes all eight instance variables starting at the instance variable pointed to by the passed argument. Thus, each called routine processes a pattern of pointer and non-pointer instance variables starting at the passed argument.

The called routines 455, 459, 463, 467 contain programmed logic to process the pointers for the next up-to-eight variables in the instantiated object data structure 400. Thus, a garbage collection procedure efficiently processes the pointers in the instance variable storage area 403 of the instantiated object data structure 400. The garbage collection procedure does this by directly accessing a procedure that processes known patterns of pointer variables instead of testing tags for each variable. Thus, the prior art variable-by-variable process that checks each variable to determine whether the variable contains a pointer is replaced by a procedure that processes eight known variables at a time without checking each variable.

The calling procedure for invoking the called routines 455, 459, 463, 467 is subsequently described. One skilled in the art will understand that, depending on the embodiment, either the called routine or the calling procedure may advance the pointer into the instance variable storage area 403. The called routines 455, 459, 463, 467 either add the specified pointers to the reference set or perform other garbage collection tasks on the specified pointers.

Figure 4D:
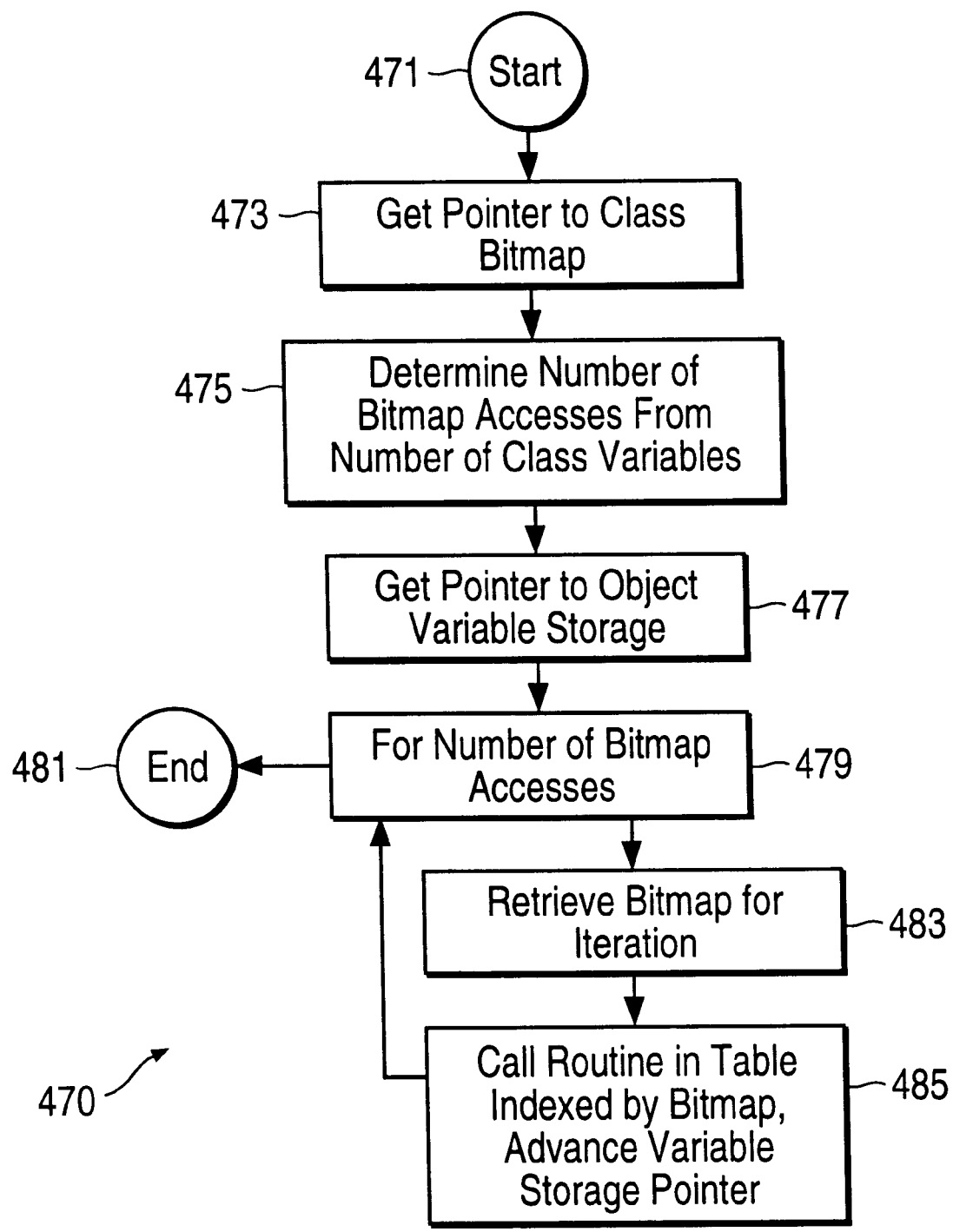
FIG. 4d illustrates a process that implements a procedure used to dispatch the called routines to process the pointers in an instance variable storage area in accordance with an embodiment of the present invention.

FIG. 4d illustrates a process, as indicated by general reference character 470, that implements the calling procedure used to dispatch the called routines 455, 459, 463, 467 used to process the pointers in the instance variable storage area 403. The process 470 initiates at a 'start' terminal 471 and continues to a procedure 473. The procedure 473 gets a pointer to the tagging bitmap 430 resident in the class. Next the process continues to a procedure 475 that determines the number of entries in the tagging bitmap 430 by using the size of the instance variable storage area 403. Then, a procedure 477 initializes a pointer to the instance variable storage area 403. Next, the process 470 advances to an iterative procedure 479 that iterates over the entries in the tagging bitmap 430. The process 470 completes through an 'end' terminal 481 after the iterative procedure 479 finishes. For each iteration controlled by the iterative procedure 479 a 'retrieve bitmap' procedure 483 retrieves the bitmap entry from the tagging bitmap 430 for the current iteration. Next, a dispatch procedure 485 indexes into the routine dispatch table 450 by the bitmap entry and calls a called routine passing the pointer into the instance variable storage area 403. When the called routine returns, the process 470 continues to the next iteration through the iterative procedure 479. One skilled in the art will understand that the called procedure or that the calling procedure may advance the variable pointer.

Depending on the implementation of the invention, the called routines 455, 459, 463, 467 perform garbage collection tasks as appropriate on the specified pointers. One skilled in the art will also understand that numerous techniques exist to specify the length of the tagging bitmap 430. These techniques include, but are not limited to, placing the length of the tagging bitmap 430 in the object, the object's class, or including the length within the tagging bitmap 430. Further, those skilled in the art will understand that the invention can be applied to data structures other than the ones described above including those data structures that are not used to implement objects and classes.

Other aspects of the invention apply to generational garbage collection techniques. As previously discussed, a hash value is a useful quasi-unique integer associated with a node. A hash value is generated once for the node and does not change for the lifetime of the node. Often, such nodes are instantiated OOP objects. Thus, the object generally provides storage for the hash value and an OOP method to return the object's hash value. One skilled in the art will understand that the same functionality can be implemented using data structures in nodes and providing procedural access to the contents of the data structure. Remembering that for many OOP applications that the life of an object is very limited (that is that most objects are created and die in the creation area) the overhead of creating the hash value for objects in the creation area is burdensome.

Figure 5A:
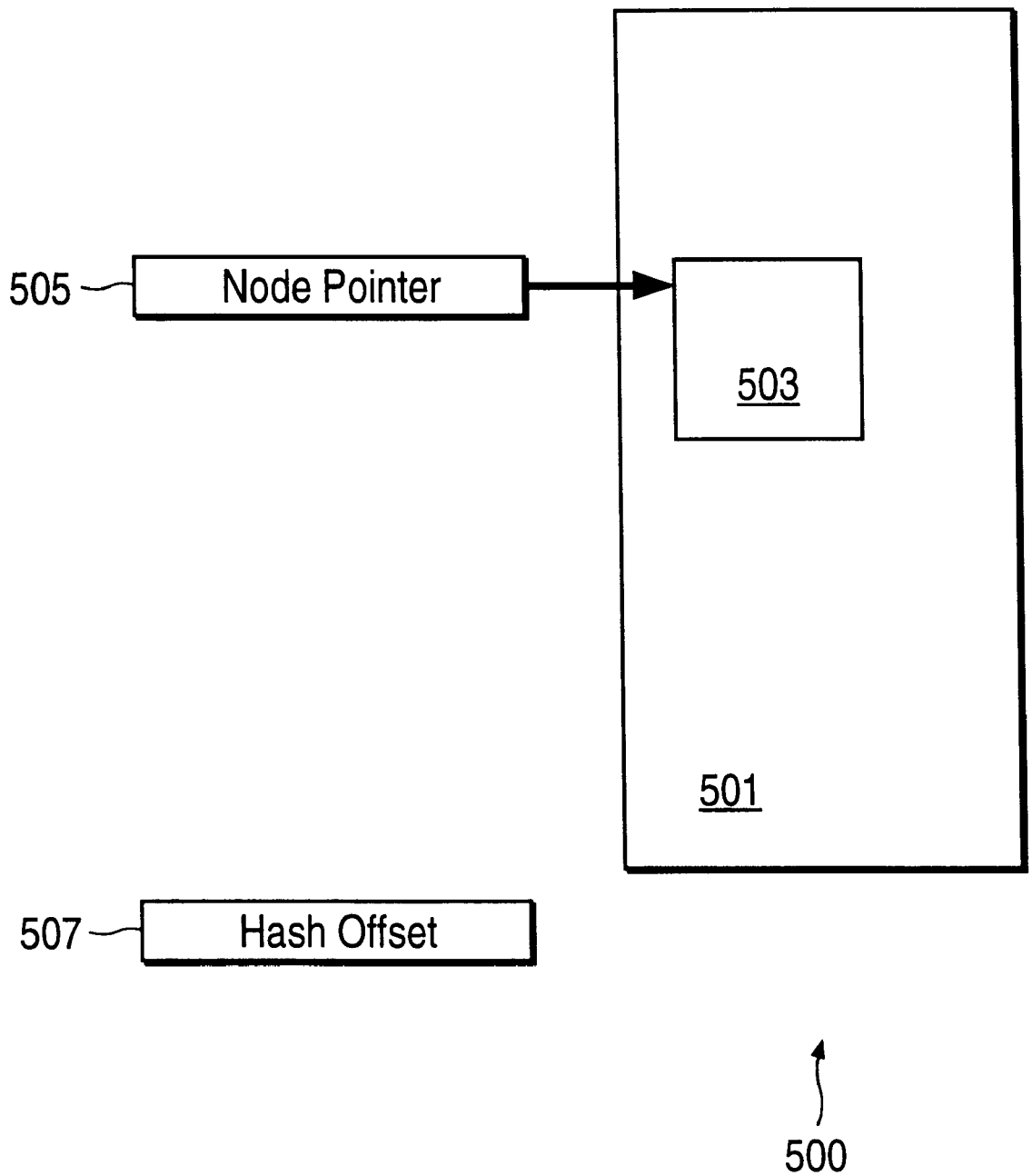
FIG. 5a illustrates a creation area containing a node in accordance with an embodiment of the present invention.

FIG. 5a illustrates a creation area indicated by general reference character 500. The creation area 500 includes a creation area 501 containing a node 503. Once allocated, the node 503 has a node address. This node address is contained in a node pointer 505 (otherwise the node 503 would be garbage). The hash value for the node 503 is determined using the contents of the node address and a 'global hash offset' variable 507. Initially, the content of the 'global hash offset' variable 507 is set to zero. After every scavenge operation on the creation area 501, the content of the 'global hash offset' variable 507 is increased by the size of the creation area 501. Whenever a scavenge operation is applied to the creation area 501 all active nodes are copied to a different generation area of heap memory (not shown). Thus, the creation area 501 is empty after a scavenge operation. The hash value of the node 503 is determined by adding the node address contained in the node pointer 505 to the contents of the 'global hash offset' variable 507. During the scavenge operation the value of the 'global hash offset' variable 507 does not change as the hash value for the copied node is calculated. The only write-memory operation directed to the 'global hash offset' variable 507 occurs at the end of the scavenge operation instead of during each hash generation—saving many memory accesses.

Figure 5B:
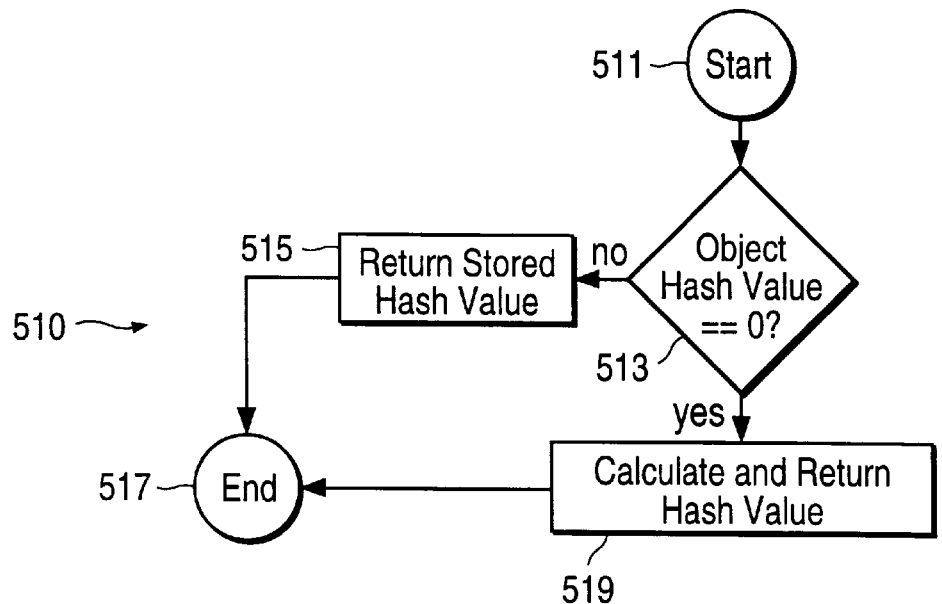
FIG. 5b illustrates a procedure that generates a hash value in accordance with an embodiment of the present invention.

FIG. 5*b* illustrates a 'get hash' procedure indicated by general reference character 510 that generates the hash value. The 'get_hash' procedure 510 initiates at a 'start' terminal 511 and continues to a decision procedure 513 that determines whether the hash value is stored in the object. In a preferred embodiment the hash value cannot be zero and so, when the object is allocated, the hash value instance variable is initialized to zero. If the content of the hash value instance variable is not zero the 'get_hash' procedure 510 continues to a 'return stored hash value' procedure 515 that returns the hash value from the object's instance variable and the 'get_hash' procedure 510 completes through an 'end' terminal 517. However if, at the decision procedure 513, the content of the object's hash value instance variable is zero the 'get_hash' procedure 510 continues to a 'calculate and return hash value' procedure 519. The 'calculate and return hash value' procedure 519 adds the object's address, contained in the node pointer 505, with the contents of the 'global hash offset' variable 507. The 'calculate and return hash value' procedure 519 returns this result. Next the 'get_hash' procedure 510 completes through the 'end' terminal 517. Thus, the processing for determining the hash value is delayed until the hash value is actually required. Because most nodes die in the creation area 501 without ever being accessed for their hash value, object allocation is more efficient than the prior art techniques. One skilled in the art will understand that in the OOP context (where the node 503 is an OOP object) the 'get_hash' procedure 510 is an OOP method for the object.

Figure 5C:
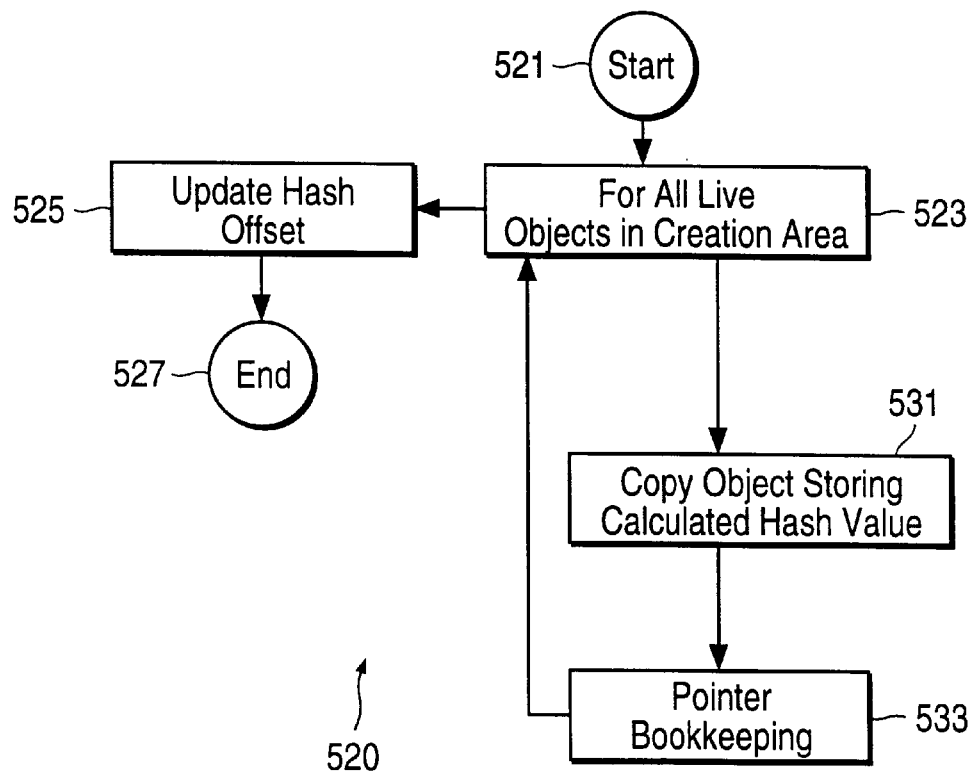
FIG. 5c illustrates a procedure that copies active nodes from the creation area to an older generation heap in accordance with an embodiment of the present invention.

FIG. 5*c* illustrates a 'copy active nodes from creation area' procedure indicated by general reference character 520. The 'copy active nodes from creation area' procedure 520 copies active nodes from the creation area 501 to an older generation heap area (not shown). The 'copy active nodes from creation area' procedure 520 initiates at a 'start' terminal 521 and continues to an iterative procedure 523 that iterates over all live nodes in the creation area 501. Once all live nodes have been iterated the process continues to an 'update hash offset' procedure 525 that adds the size of the creation area 501 to the contents of the 'global hash offset' variable 507. The 'copy active nodes from creation area' procedure 520 then completes through an 'end' terminal 527. For each iteration of the iterative procedure 523 a 'copy object storing calculated hash value' procedure 531 copies the node from the creation area to an older generation. The 'copy object storing calculated hash value' procedure 531 also calculates the hash value and stores the calculated hash value in the copied node while the node is being copied. Thus, no additional memory write operation is required beyond those required to copy the node. A 'pointer bookkeeping' procedure 533 then adjusts existing pointers to the prior location of the node to point to the new location of the node now residing in the older generation. Next the 'copy active nodes from creation area' procedure 520 continues with the iterative procedure 523 to process the next live object. Thus the overhead of generating the hash value for an object is postponed until the object is copied to an older generation or until the object is asked to return its hash value while residing in the creation area 501. Either the 'copy active nodes from creation area' procedure 520 or the 'get_hash' procedure 510 trigger a generate hash condition that generates the hash value.

The invention is more efficient than the prior art especially when there are many short-lived nodes that require hash values. It is more efficient because the content of the 'global hash offset' variable 507 is only updated at each scavenge instead of being loaded from memory and stored to memory during every hash value calculation as is required by the prior art. Further, the memory write operation needed to store the hash value in the object replaces the memory write operation required to copy that field of the node. Thus, no additional overhead memory access is used to store the hash value in the node.

Another aspect of the invention is enabled because the size of the creation area is small in comparison to the rest of the heap. This means that the entirety of the creation area can be accessed by a limited field length offset into the creation area. Thus, a link to a node in a one megabyte creation area can be specified using only eighteen bits of a word (assuming word alignment on a four-byte addressable computer architecture). Whereas a pointer uses 32 bits in 32 bit computers a link can use eighteen bits as a word index into the creation area and use fourteen bits as a validation value. The validation value is used to indicate non-updated accesses to the creation area after the creation area has been scavenged but before all pointer and link updates have completed. Assuming a large enough pointer size links and pointers are differentiated by the most significant bit (MSB) of the value. The MSB for a pointer is zero and that of a link is one.

Figure 6A:
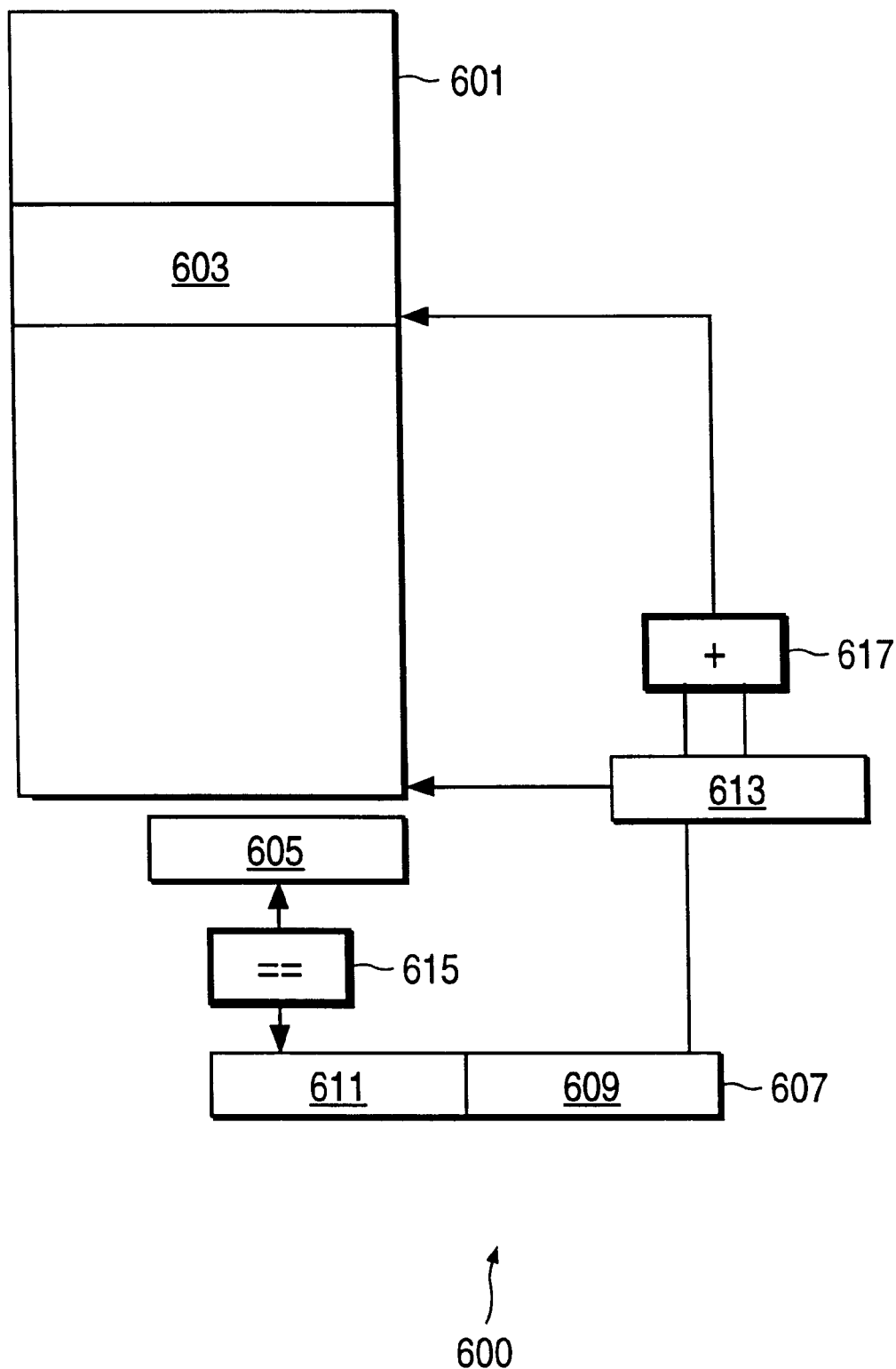
FIG. 6a illustrates a linked-reference creation area containing a node in accordance with an embodiment of the present invention.

FIG. 6*a* illustrates a link-referenced creation area indicated by general reference character 600 having a creation area 601 containing a node 603. The creation area 601 is associated with an area validation value 605 that contains the validation value for the current scavenge operation of the creation area 601. A preferred embodiment first initializes the area validation value 605 to zero and then increments the area validation value 605 on each scavenge operation. A link 607 contains a 'link offset' field 609 and a 'link validation' field 611. The 'link offset' field 609 contains an offset, into the creation area 601, used to specify the node 603. The 'link validation' field 611 contains a copy of the contents of the validation variable for the creation area 601 at the time the link 607 was created (that is, at the time the node was allocated). A creation base address 613 contains the address of the start of the creation area 601. An equality comparison 615 performs an equality comparison between the contents of the area validation value 605 and the contents of the 'link validation' field 611. Thus, when the link 607 is supplied to reference the node 603, the contents of the 'link validation' field 611 and the area validation value 605 are compared for equality. If the contents of the area validation value 605 and the 'link validation' field 611 are equal, the 'link offset' field 609 and the creation base address 613 are summed by an addition operation 617 to obtain the address of the node 603.

However, if the contents of the 'link validation' field 611 and the area validation value 605 are different, the creation area 601 has been scavenged subsequent to when the link 607 was constructed—thus, the node 603 has been copied from the creation area 601 to a pointer-referenced heap area (not shown). In this circumstance, as subsequently described, the new location of the node 603 in the pointer-referenced heap area is located and the is link converted to a pointer.

Figure 6B:
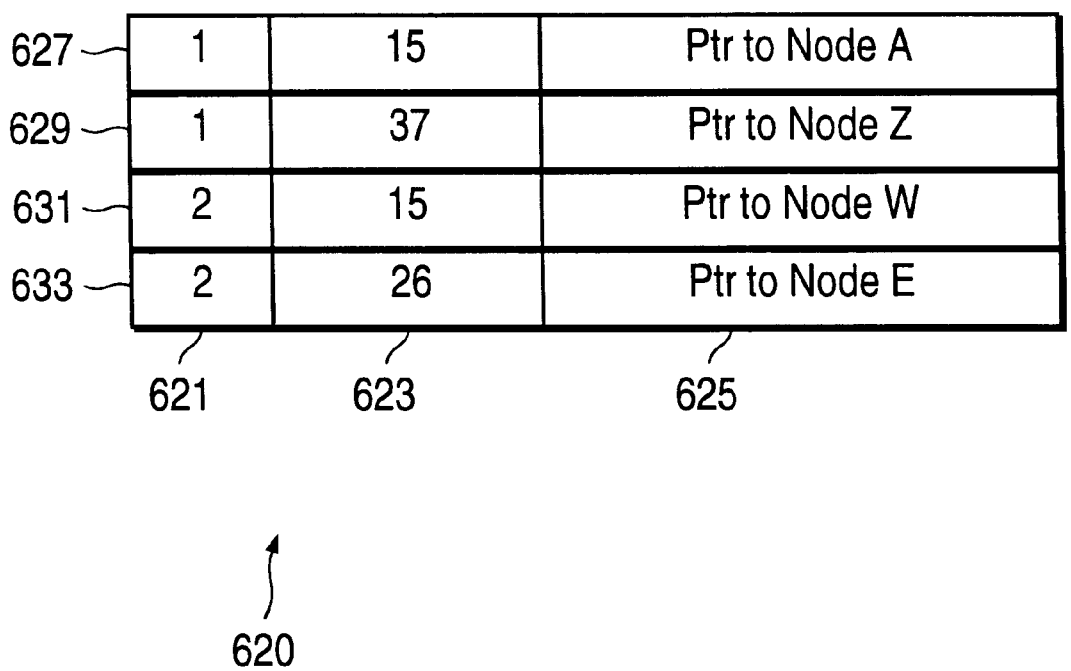
FIG. 6b illustrates a link-to-pointer translation table in accordance with an embodiment of the present invention.

FIG. 6*b* illustrates a link-to-pointer translation table indicated by general reference character 620. The link-to-pointer translation table 620 is organized into rows of columns. Each row contains data related to a node copied from the creation area 601. The columns include a 'link validation' field 621, a 'link offset' field 623 and a 'node pointer' field 625. The 'link validation' field 621 contains the validation value for the node 603 when the node 603 was created in the creation area 601. The 'link offset' field 623 contains the link offset value for the node 603 when the node 603 was created in the creation area 601. The 'node pointer' field 625 contains a pointer (the current address) to the copied node. Thus, a first entry 627 contains an entry that associates a link to node 'A' created prior to scavenge '1' that was located at a word offset of '15' from the start of the creation area 601 and now existing at the location specified by the 'node pointer' field 625 of the first entry 627. Similarly for a second entry 629 but for node 'Z'. A third entry 631 associates a link to node 'W' created after scavenge '1' but prior to scavenge '2' that was located at a word offset of '15' from the start of the creation area 601 and now existing at the location specified by the 'node pointer' field 625 of the third entry 631. Notice that the 'link offset' field 623 for both the first entry 627 and the third entry 631 are the same. Thus both nodes 'A' and 'W' were allocated at the same location in the creation area 601, but at different times (as shown by the different values in the 'link validation' field 621). One skilled in the art will understand that many possible structures exist to embody this table. These include, without limitation, a contiguous table for all entries, linked tables for each value of the 'link validation' field 621 and many other organizations known by those skilled in the art.

Figure 6C:
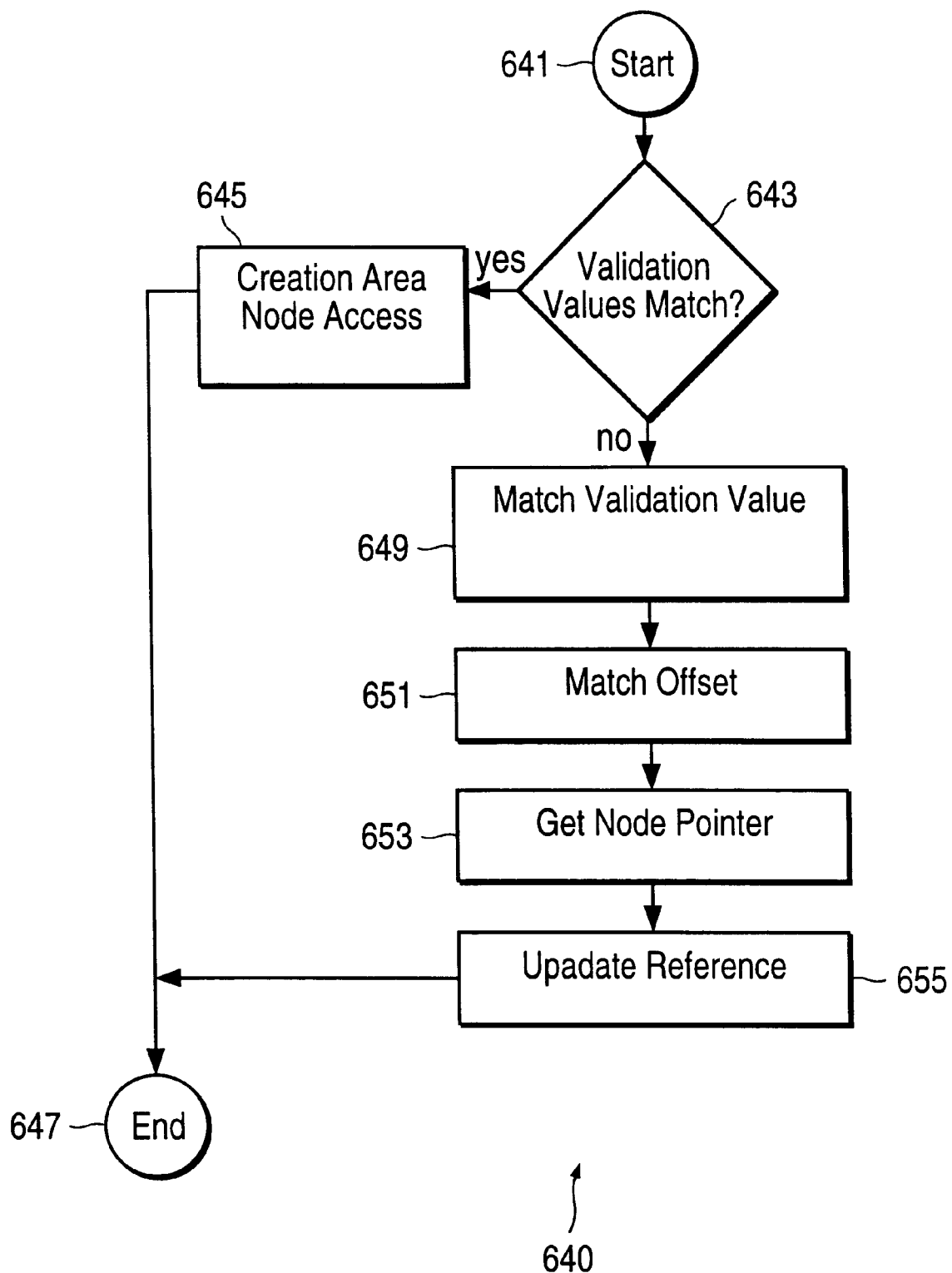
FIG. 6c illustrates a link access process for accessing a given a link to a node in accordance with an embodiment of the present invention.

FIG. 6*c* illustrates a link access process indicated by general reference character 640 used to access a node given a link to the node. The link access process 640 initiates at a 'start' terminal 641 and continues to a decision procedure 643 that determines whether the contents of the 'link validation' field 611 of the link match the contents of the area validation value 605 for the creation area 601. If the contents of the 'link validation' field 611 and the area validation value 605 match, the process continues to a 'creation area node access' procedure 645 that provides access to the node stored in the creation area 601. This access is provided by generating a pointer to the node by adding the 'link offset' field 609 to the creation base address 613 to construct a pointer to the node. Next, the link access process 640 completes through an 'end' terminal 647. However, if at the decision procedure 643 the contents of the 'link validation' field 611 and the area validation value 605 do not match, node has been copied from the creation area. In this situation the process continues to a 'match validation' procedure 649 that searches the link-to-pointer translation table 620 for a match between the 'link validation' field 621 in the link-to-pointer translation table 620 and the 'link validation' field 611 of the provided link. Once a match is found, the link access process 640 continues to a 'match offset' procedure 651 that searches the 'link offset' field 623 of the link-to-pointer translation table 620 for an entry that matches the contents of the 'link offset' field 609. When the matching entry in the link-to-pointer translation table 620 is found, the link access process 640 advances to a 'get node pointer' procedure 653 that retrieves the pointer to the copied node from the 'node pointer' field 625 of the matching entry in the link-to-pointer translation table 620. This retrieved pointer is used to access the copied node in the pointer-referenced heap area. Next, the link access process 640 advances to an 'update reference' procedure 655 that updates the node reference from the link form to the pointer form by causing the referencing procedure to replace the stored link to the node with the pointer to the node. The link access process 640 completes through the 'end' terminal 647.

One skilled in the art will understand that the use of links to reference nodes that are or have been in the creation area 601 allows the pointer update portion of the scavenge operation to be interrupted. Thus, real-time systems that cannot absorb the time required to completely update all references to a node copied from the creation area 601 can partially update the references to copied nodes in the available time, without disrupting the real-time nature of the application. As previously described, a link reference to a copied node will be detected and the reference changed to a direct pointer reference to the copied node even during the period that the updating process is interrupted.

One of the main advantages of generational garbage collector techniques is that they only examine nodes that are still alive at scavenge time. However, this advantage is lost when using weak pointers. Weak pointers are those that reference nodes without affecting the lifetime of the referenced nodes. The prior art garbage collection techniques implement weak pointers as direct pointers. Thus, at scavenge time, all freed nodes must be searched to guarantee that no weak pointer reference to a freed node survives the scavenge. This search impacts the previously mentioned advantage of generational garbage collection techniques.

However, links can be used to implement weak pointers that reference nodes without affecting the lifetime of the referenced nodes. This implementation allows the original advantage of only scanning nodes that survive the scavenge. Nodes that do not survive will have no corresponding entry in the link-to-pointer translation table. A link that has no entry in the link-to-pointer translation table is simply a garbage collected node. Weak references that point to garbage allow the garbage nodes to be reallocated whenever it is convenient.

Figure 6D:
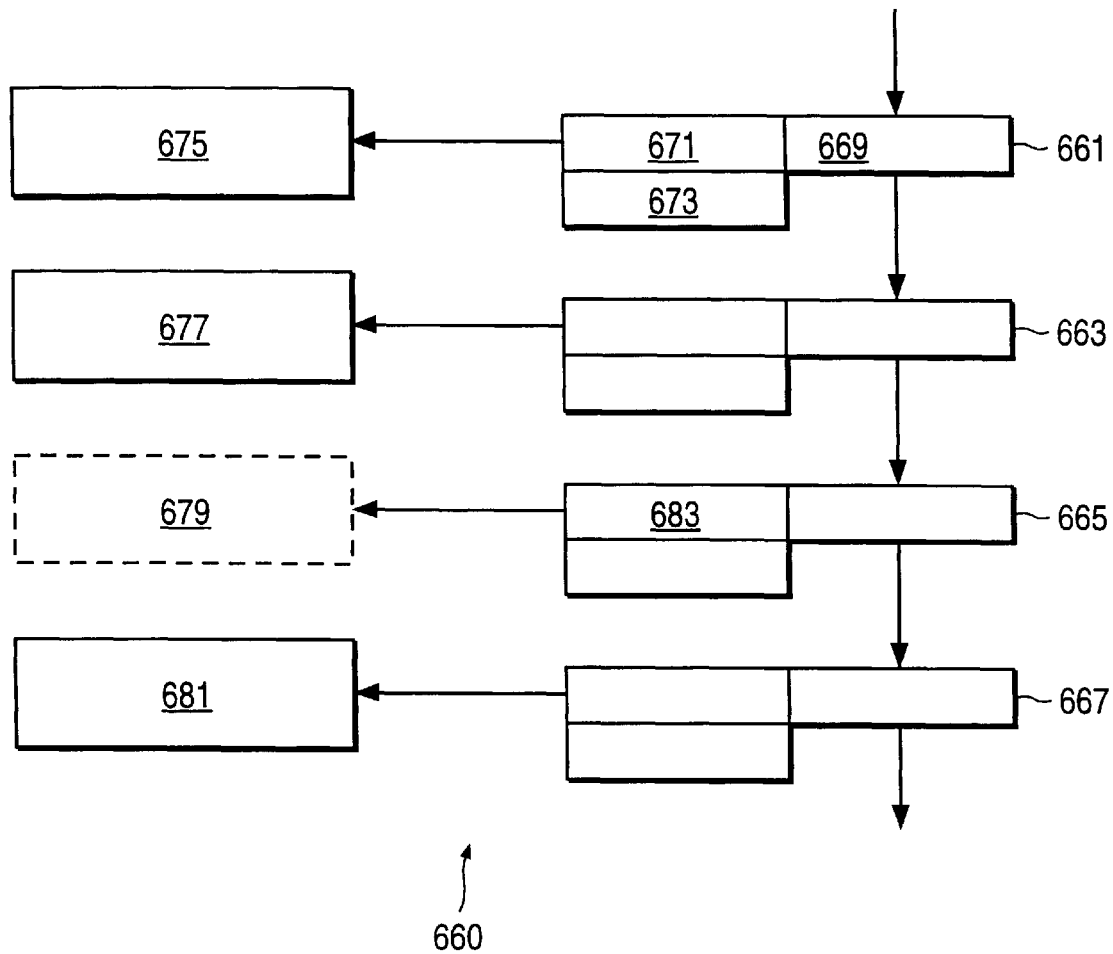
FIG. 6d illustrates a partial node list including a plurality of node descriptors in accordance with an embodiment of the present invention.

FIG. 6*d* illustrates a partial node list indicated by general reference character 660. The partial node list 660 includes a plurality of node descriptors 661, 663, 665, 667. Each node descriptor includes a 'next descriptor' pointer 669 that is a pointer to the next node descriptor of the partial node list 660. Additionally each node descriptor includes an active node link 671 that contains a link to a live or garbage node in the heap. Each node descriptor also includes a 'node information' field 673 that contains additional information about the linked node. This information typically consists of the status and size of the linked node. The node descriptor 661 references a first active node 675. Similarly for the rest of the plurality of node descriptors 663, 665, 667 referencing a second active node 677, a garbage node 679 and a third active node 681. The garbage node 679 is referenced by the node descriptor 665 and because a link, instead of a direct pointer, is stored in an active node link 683 the garbage collection process can reference the garbage node 679 without affecting the liveness of the garbage node 679.

The invention also encompasses techniques related to card marking. Card marking is useful to indicate interesting areas of the heap. Write-barrier techniques indicate which cards have been modified and so help optimize locating modified pointers by limiting the amount of the heap that needs to be checked. Card marking can also be used to indicate which nodes in an older generation contain pointers to the younger generation. Thus, a particular carded area of the heap may have multiple marking vectors each customized for a particular purpose.

Figure 7A:
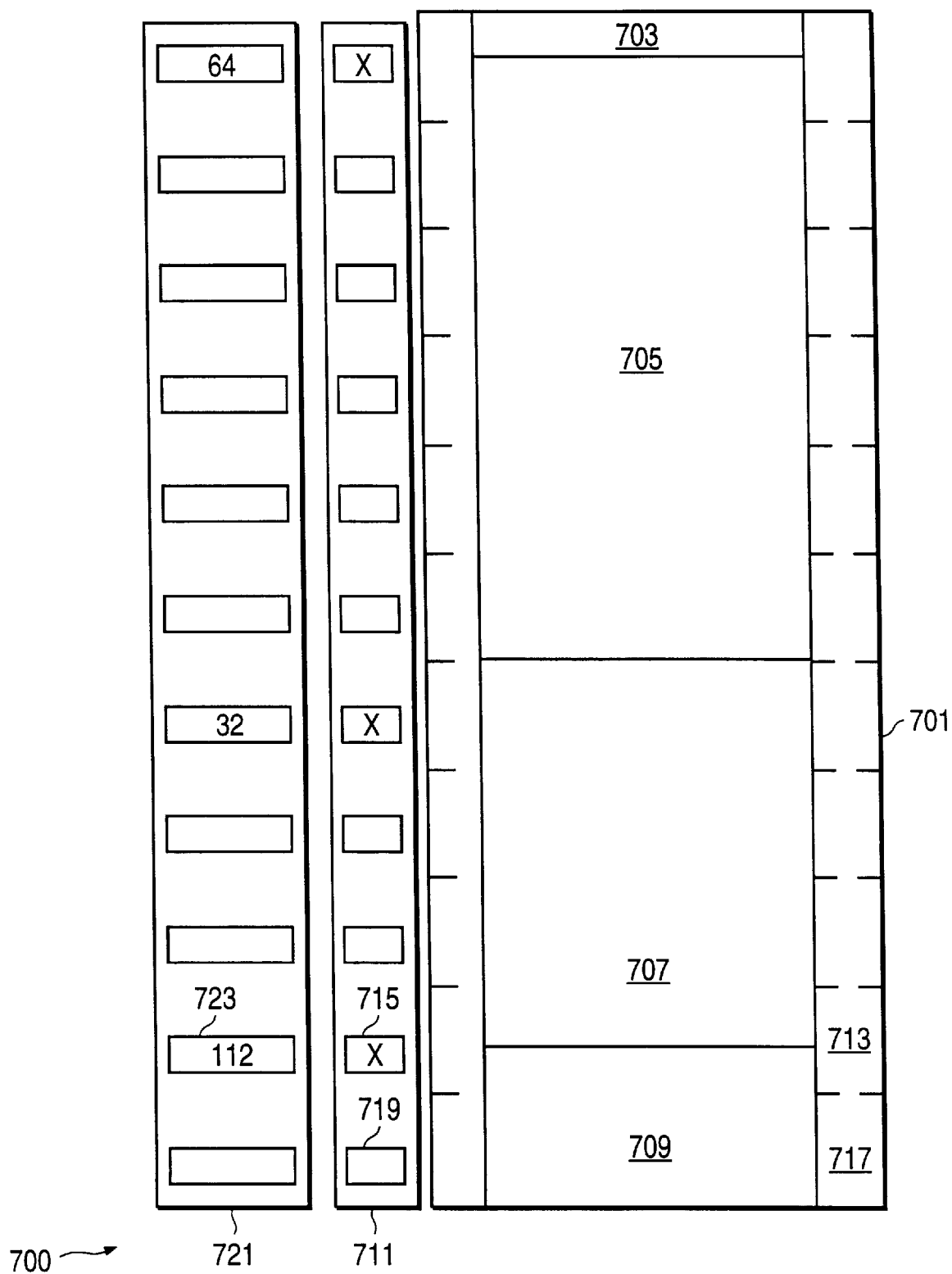
FIG. 7a illustrates a card marking structure used to determine the location of a node reference in a carded heap memory area in accordance with an embodiment of the present invention.

FIG. 7a illustrates a card marking structure, indicated by general reference character 700, used to determine the location of a node reference in a carded heap memory area 701. In one preferred embodiment the node reference is the beginning of the node. In another preferred embodiment the node reference is the node's header. Determining the start or header of a node, given a marked card, is useful because the garbage collection process must use information stored in the node to locate pointers in the cards. These pointers are often added to the root set. Subsequent nodes in a card are found by using the node advance value. This node advance value is added to the location of the node reference to advance to the node reference in the next node. The following discussion uses the beginning of the node as the node reference and the node size as the node advance value. In FIG. 7a a plurality of nodes 703, 705, 707, 709 are shown distributed in the carded heap memory area 701. A 'node start' vector 711 indicates which cards in the carded heap memory area 701 contain the starting boundary of a node. In a first preferred embodiment, this indication is stored in one bit per card in the 'node start' vector 711. Thus in FIG. 7a, because the starting boundary of the fourth node 709 is in a card 713, a corresponding entry 715 in the 'node start' vector 711 is set. Because a card 717 does not contain a starting boundary, a corresponding entry 719 in the 'node start' vector 711 is clear. One skilled in the art will understand that the 'node start' vector 711 values can also indicate the location of the node header instead of the node boundary. This approach can be used with nodes that contain a bifurcated data structure such as described related to FIG. 3.

Corresponding to each header card in the 'node start' vector 711 is a field, contained in a 'node offset' structure 721, that contains an offset from the start of the associated card to the first node boundary in the card. In this preferred embodiment, the field is a byte field and thus the card's length can be up to 256 addressable memory units (typically words). For example, a 'node offset' field 723 associated with the card 713 contains a value of '112'. Thus, 112 words from the start of the card 713 is the first node boundary—that of the fourth node 709.

Once the start of the first node in the card is found subsequent nodes can be examined to gather pointers if the nodes contain the node size and an indication as to which variables in the node contain pointers. Thus, given a marked card indicating a changed pointer or a old-new pointer in a card, the process uses the 'node start' vector 711 and the 'node offset' structure 721 to quickly locate and process the nodes that overlap the marked card.

Figure 7B:
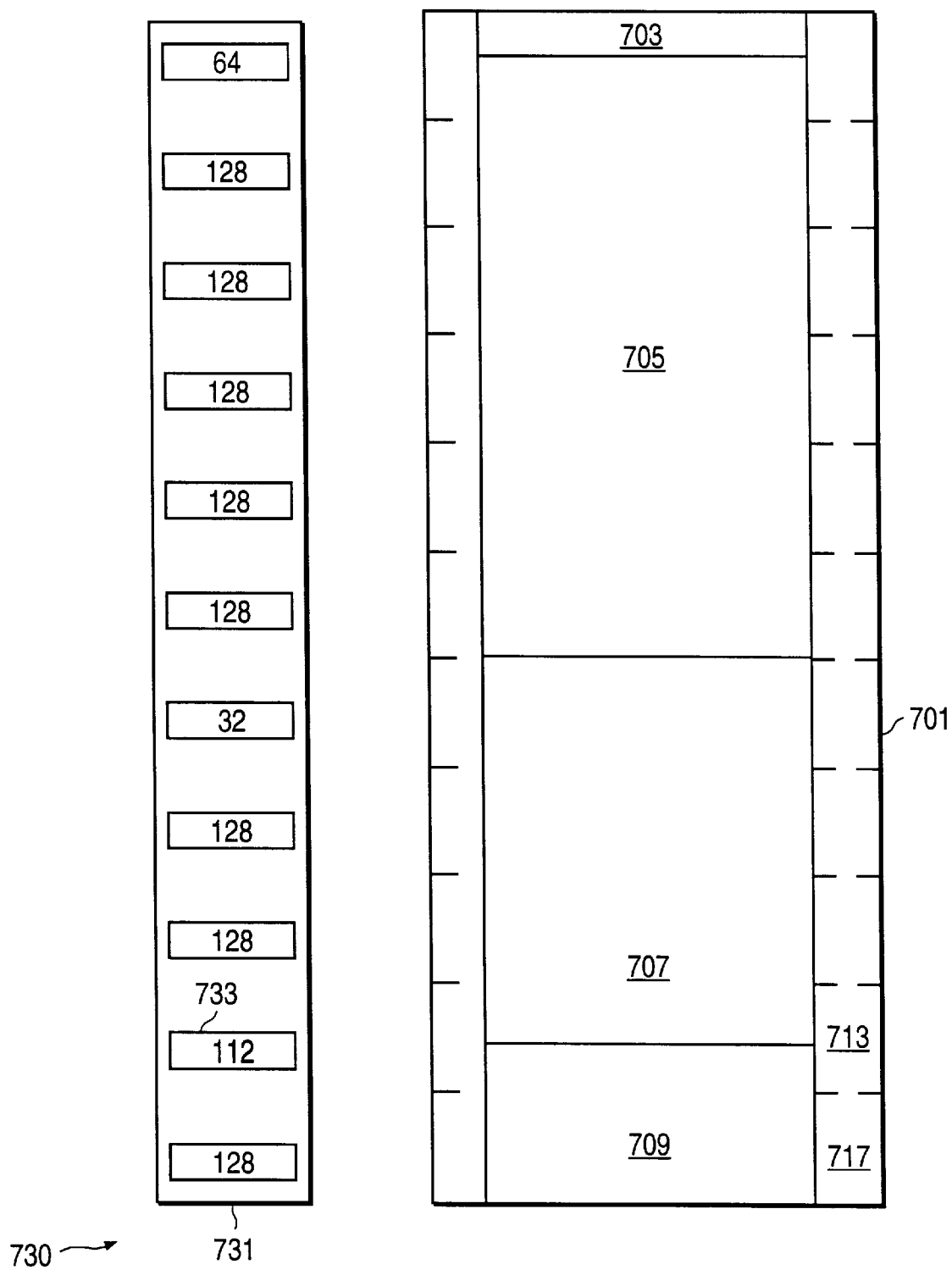
FIG. 7b illustrates a card marking structure wherein a node offset structure and a node start vector are combined into a compressed node offset structure in accordance with an embodiment of the present invention.

FIG. 7b illustrates a card marking structure indicated by general reference character 730 in an embodiment where the 'node offset' structure 721 and the 'node start' vector 711 of FIG. 7a are combined in a 'compressed node offset' structure 731. The carded heap memory area 701, the first node 703, the second node 705, the third node 707 and the fourth node 709 are the same (but for the size of the cards) in FIG. 7b as in FIG. 7a. In this embodiment, the 'compressed node offset' structure 731 contains byte fields that combine the functions of the 'node start' vector 711 and the 'node offset' structure 721 shown in FIG. 7a. One consequence of this embodiment is that the cards are now limited to at most 128 addressable memory units (again typically words) instead of the 256 or more allowed by the card marking structure 700 in FIG. 7a. In this embodiment a value of up to 127 indicates that a card contains a node boundary and specifies the first node boundary in the card. Cards that do not contain a node boundary are indicated by a value of 128. Thus, a value of 112 in a combined node offset and node boundary indicator field 733 indicates that the card 713 includes a node boundary and specifies the first node boundary in the card. A value of 128 in a combined node offset and node boundary indicator field 735 indicates that the card 717 does not contain a node boundary.

Figure 7C:
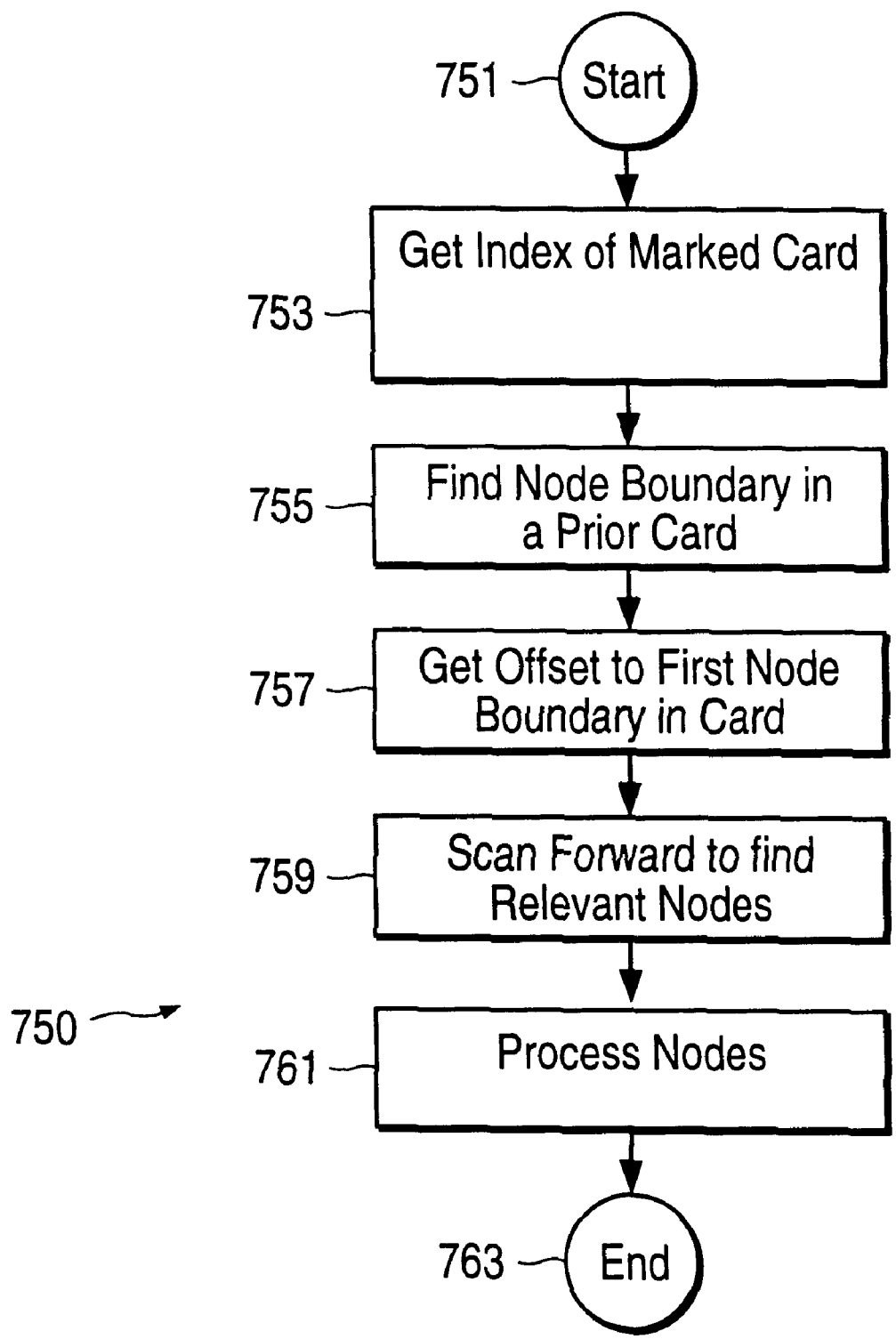
FIG. 7c illustrates a node location process in accordance with an embodiment of the present invention.

FIG. 7c illustrates a node location process indicated by general reference character 750. The node location process 750 initiates at a 'start' terminal 751 and continues to a 'get index of marked card' procedure 753. The 'get index of marked card' procedure 753 either receives the pointer containing an address within a node and generates a card index from the address or simply receives an index of a marked card or some other card identifier. Then, at a 'find node boundary in prior card' procedure 755, the 'node start' vector 711 is accessed starting at the prior index and scanning up the 'node start' vector 711 until a card is found that includes a node boundary. One skilled in the art will understand how to modify the 'find node boundary in prior card' procedure 755 for write barrier implementations that mark the card containing the node boundary instead of the card being modified. Then the node location process 750 continues to a 'get offset to first node boundary in card' procedure 757 retrieves the associated offset of the boundary of the first node in the card. Then, a 'scan forward to find relevant node' procedure 759 follows the nodes forward until the node that intersects the marked card is found. Next at a 'process node' procedure 761 the pointers in node are processed. Subsequent pointers in the card are also processed. Finally, the node location process 750 completes through an 'end' terminal 763.

Thus, given an address within a carded memory area or the card index, the invention quickly finds the nodes that contains pointers related to a marked card.

Figure 1C:
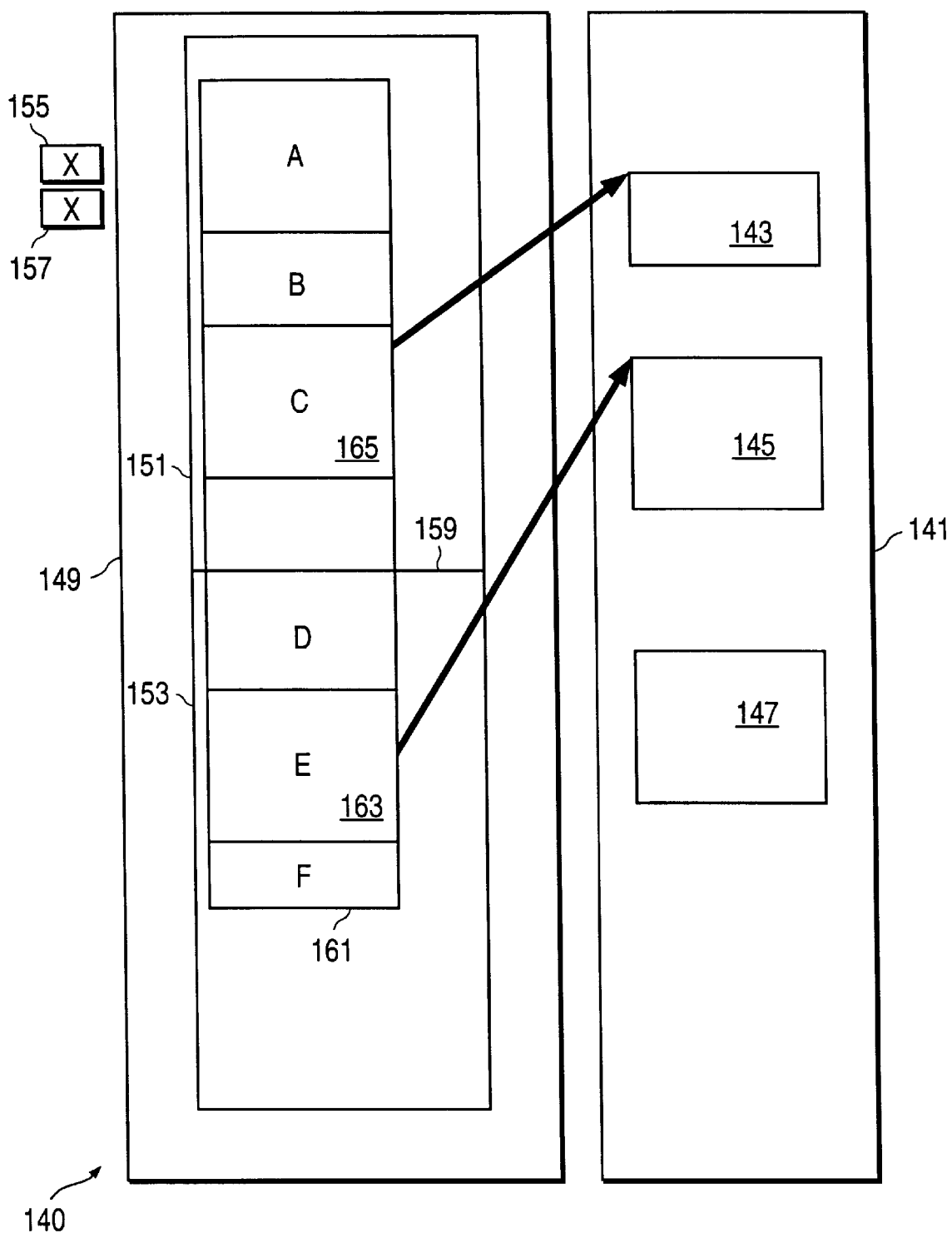
FIG. 1c illustrates the problem of the prior art with a "card marking structure."
Figure 1D:
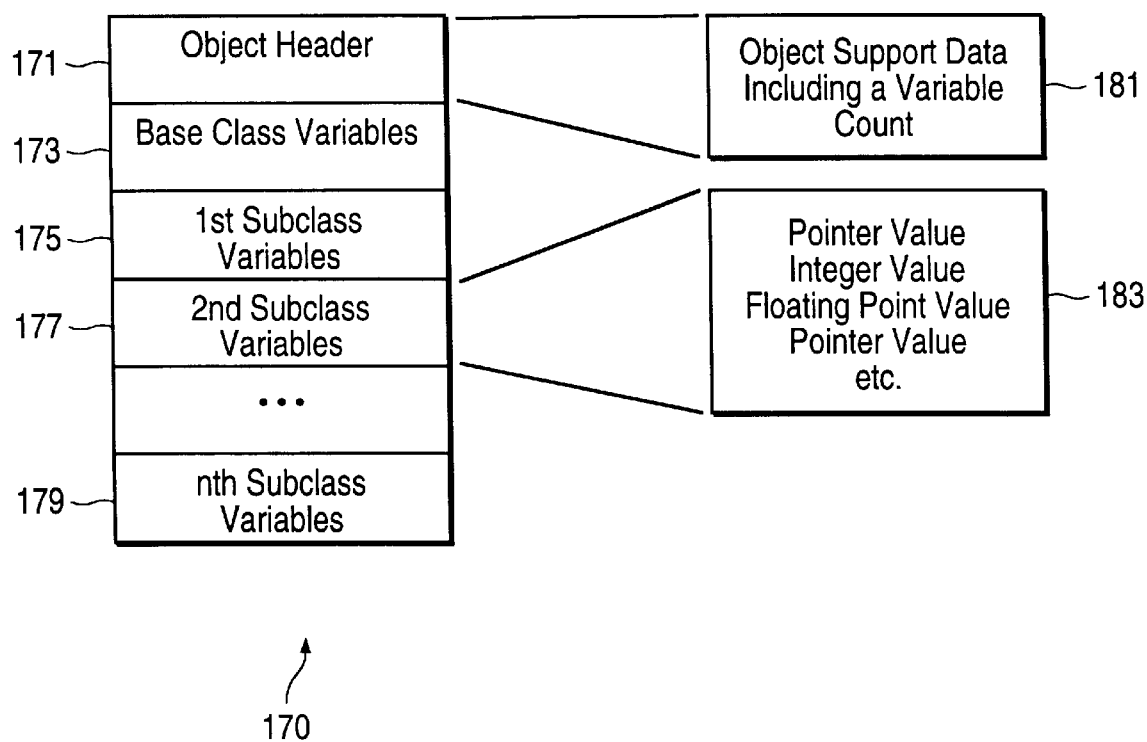
FIG. 1d illustrates the conceptual aspects of an instantiated object.

As previously described with respect to FIG. 1c, one goal of card marking, when used with a generational garbage collection algorithm, is to skip over objects in the copied generation area of the heap that do not reference objects in the creation area of the heap. However, this goal is lost if the density of such nodes in the older generation is such that most cards are marked.

Figure 8A:
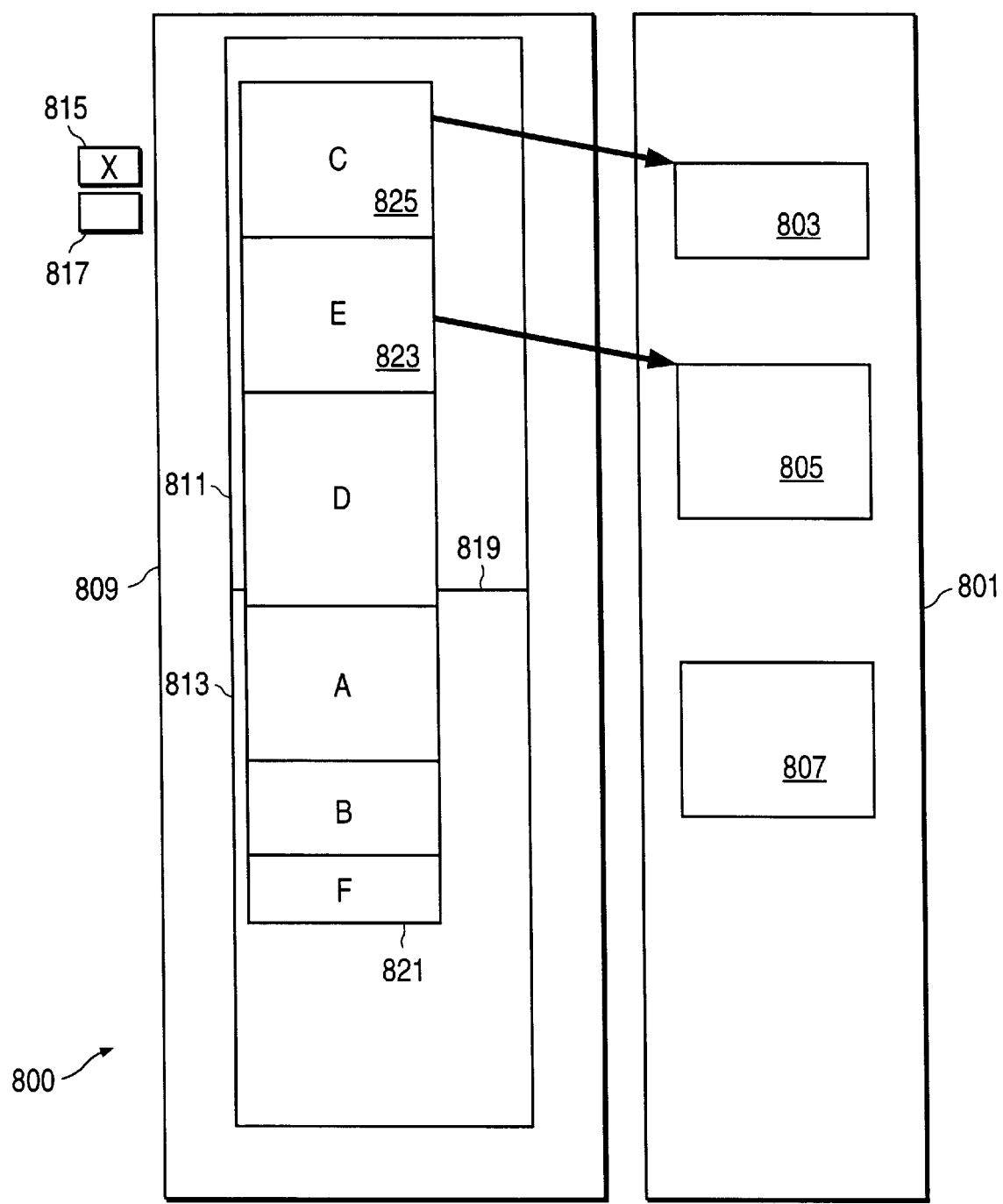
FIG. 8a illustrates the card marking structure that results from operation of one embodiment of the present invention on the card marking structure illustrated in FIG. 1c.

The result of a preferred embodiment of the invention (subsequently described) is illustrated in FIG. 8a. The preferred embodiment of the invention reorders the older generation when scavenging so that nodes that contain pointers to the younger generation are localized.

FIG. 8a illustrates a card marking structure as indicated by general reference character 800 resulting from the operation of the invention on the 'card marking structure' 140 illustrated in FIG. 1c. A younger area of the heap 801 contains at least one node 803, 805, 807. An older generation area of the heap 809 is segmented into a plurality of cards 811, 813. The card 811 is associated with a card marker 815 and the card 813 is associated with a card marker 817. A card boundary 819 indicates the ending of the card 811 and the start of the card 813. The older generation area of the heap 809 contains a 'number of nodes (A–F)' 821 including a 'node E' 823 and a 'node C' 825. In the card marking structure 800 the 'node E' 823 includes a pointer to the node 805 and the 'node C' 825 includes a pointer to the node 803 both in the younger area of the heap 801. The card marker 815 is marked because a node in the card 811 references the younger area of the heap 801. In this example both the 'node E' 823 and the 'node C' 825 reference the younger area of the heap 801. The card marker 817 is not marked because no node in the card 813 references the younger area of the heap 801. Thus, the goal of card marking is achieved by localizing the nodes in the older generation area of the heap 809 that contain pointers to the younger area of the heap 801.

Figure 8B:
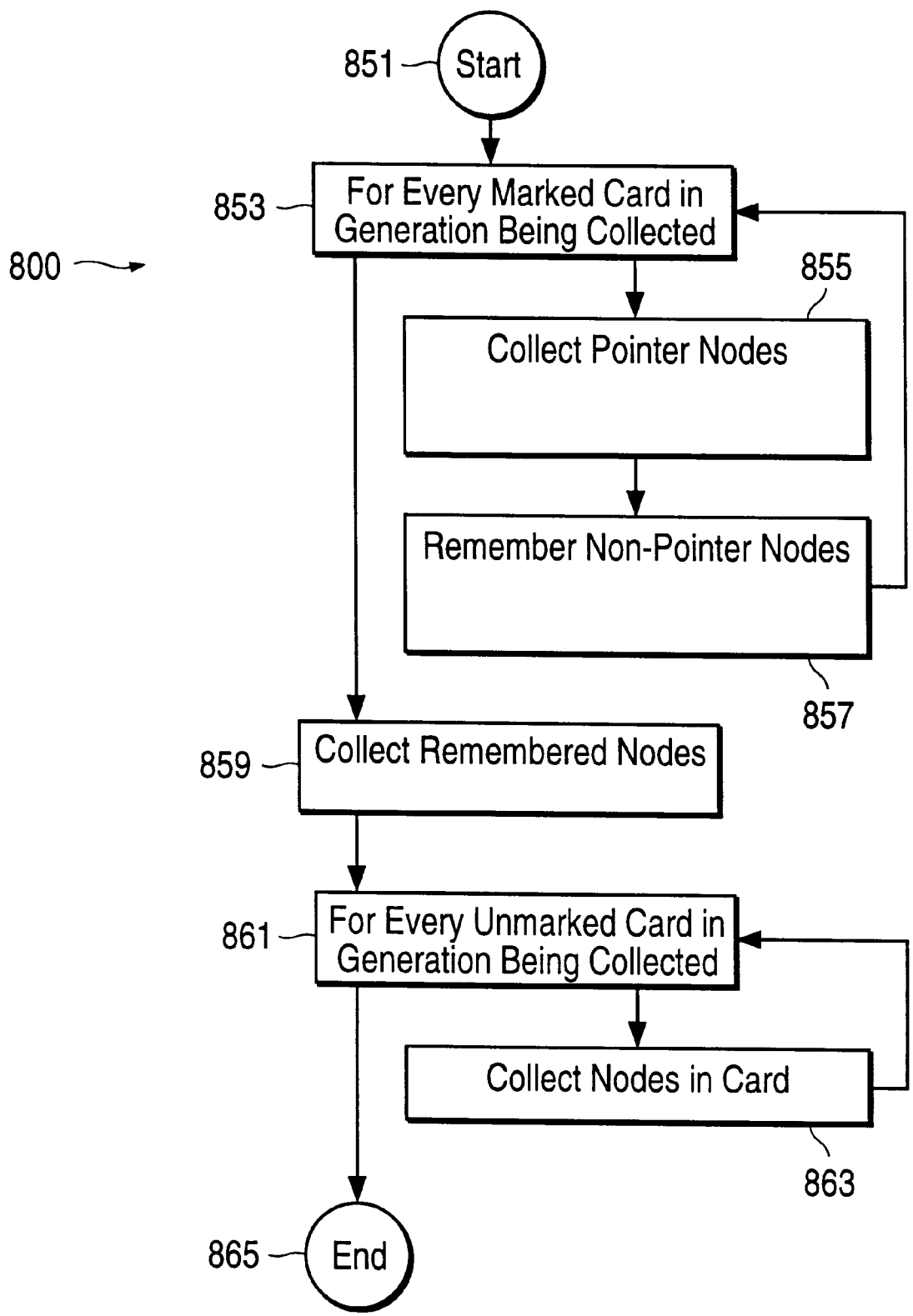
FIG. 8b illustrates a node collection process in accordance with an embodiment of the present invention.

FIG. 8b illustrates a node collection process indicated by general reference character 850. The node collection process 850 initiates at a 'start' terminal 851 and continues to an iterative procedure 853. The iterative procedure 853 iterates over the marked cards of the generation being collected. At a 'pointer node collection' procedure 855 each node or partial node that contains a pointer to a younger generation is collected. One skilled in the art can handle nodes that cross card boundaries. A 'remember non-pointer node' procedure 857 remembers each node in the card that does not have a pointer into a younger generation. The process continues back to the iterative procedure 853 until all marked cards are processed. Thus, all nodes in the generation that have pointers to a younger generation are localized in memory as indicated in FIG. 8a. One skilled in the art will understand that the collection procedure marks the appropriate cards for the copied generation. Next, the process continues to a 'collect remembered nodes' procedure 859 that collects the nodes remembered during the 'remember non-pointer node' procedure 857. These nodes do not contain pointers to a younger generation and so only need to be transferred to the copied generation area. Next, at an iterative procedure 861 every unmarked card is examined. Each node in the unmarked card is collected by a 'collect nodes in card' procedure 863. The process repeats though the iterative procedure 861 until all unmarked cards are processed. Finally the process completes through an 'end' terminal 865 leaving the card marking structure 800 of FIG. 8a.

Another way to improve the efficiency of locating pointers in a card marked heap is to provide additional information for data structures containing pointers. In particular, this additional information specifies which variables in the data structure have been changed by a program loop that uses a loop-control variable as an index into an array of data structures. Further, the invention improves the efficiency of loops by moving the write-barrier instructions, associated with the assignment operations of pointer values to a pointer array, out from within the iterative portion of the loop. Thus, this aspect of the invention improves the execution speed of the program when assigning values to a pointer array in a card-marked heap. Another aspect of the invention improves the efficiency of the garbage collection operation of locating modified pointers in the card-marked heap.

Figure 9A:
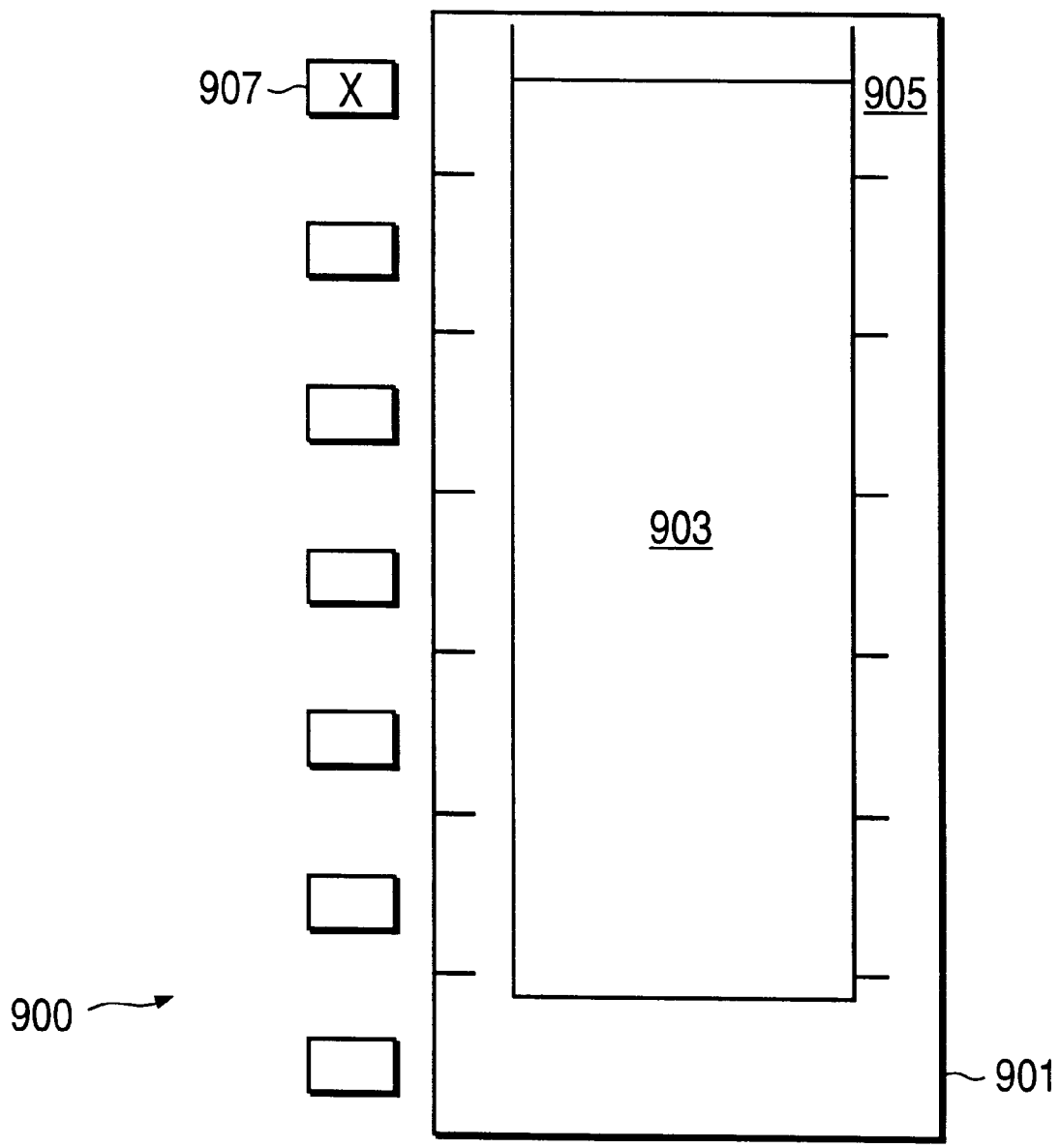
FIG. 9a illustrates a card-marked region of memory having a card-marked heap in accordance with an embodiment of the present invention.

FIG. 9a illustrates a card-marked region of memory indicated by general reference character 900 having a card-marked heap 901. The card-marked heap 901 contains a pointer array structure 903 having its start in a card 905. Because a pointer value in the pointer array structure 903 has been modified during the execution of a loop, the card marker 907 is marked as is subsequently described.

Figure 9B:
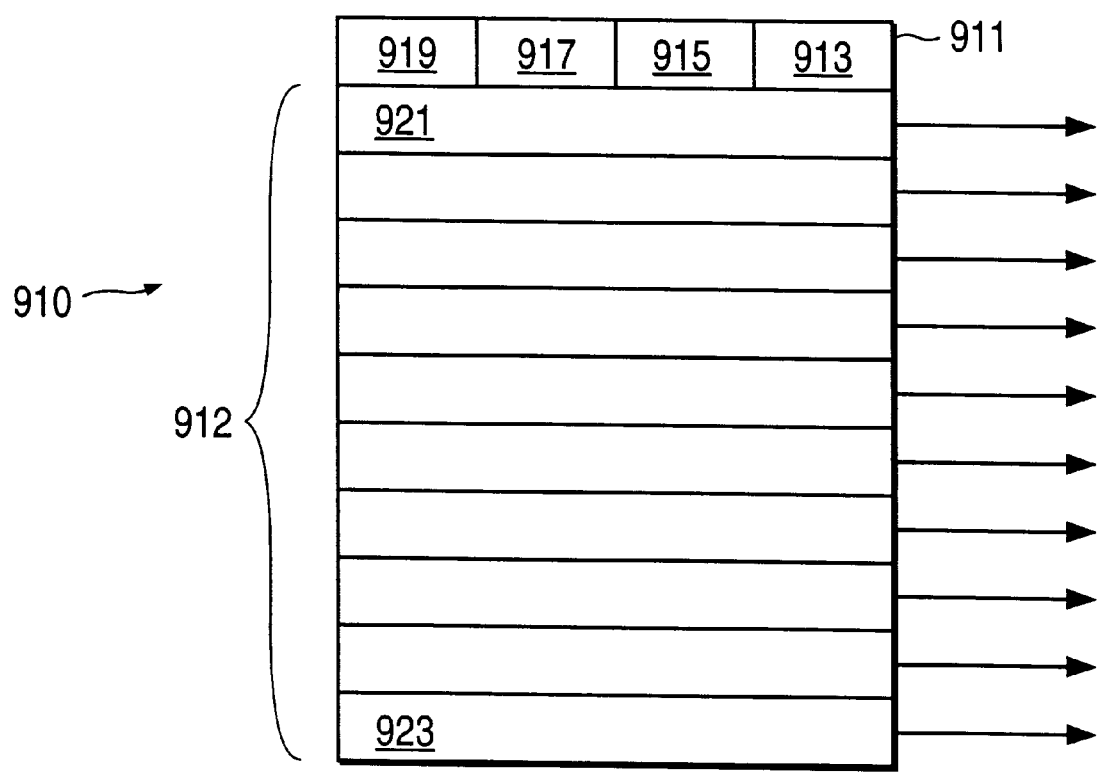
FIG. 9b illustrates a pointer array structure containing an array header and an array data area in accordance with an embodiment of the present invention.

FIG. 9b illustrates a pointer array structure indicated by general reference character 910. The pointer array structure 910 contains an array header 911 and an array data area 912. The array header 911 is used to parameterize the pointer data contained in the array data area 912 and includes a 'first' field 913, a 'last' field 915, a 'stride' field 917, and a 'pointer array initialization' field 919. The array data area 912 contains a 'first array pointer' element 921 and a 'last array pointer' element 923 surrounding the other pointer elements in the pointer array structure 910. The 'first' field 913 contains the index of the first element that changed in the array data area 912. The 'last' field 915 contains the index of the last element that changed in the array data area 912. The 'stride' field 917 contains the stride between each of the changed elements in the array data area 912. The 'pointer array initialization' field 919 contains the initial values of the 'first' field 913. The information in the 'pointer array initialization' field 919 is used to reset the 'first' field 913 after a scavenge operation is completed on the card-marked heap 901. The initial value for the 'first' field 913 is the maximum array index. The initial value for the 'last' field 915 is zero. The initial value for the 'stride' field 917 is also zero. These fields are reset to their initial values after a scavenge operation.

A 'for' statement in 'C' (and similar loop statements in other programming languages) contains a starting index, and ending index and a stride. The 'for' statement assigns the start index to a control variable. The stride is added to this control variable on each iteration of the body of the 'for' statement until the control variable reaches the ending index at which point the 'for' statement completes. Thus, a pointer assignment to an element of the pointer array structure 910 indexed by the control variable in such an iterative statement provides a pattern of pointer assignments in the pointer array structure 910. This pattern is used by the garbage collection algorithm when scanning the heap for pointers. One skilled in the art will understand that the invention is useful with general loop constructs not just the 'for' statement.

Figure 9C:
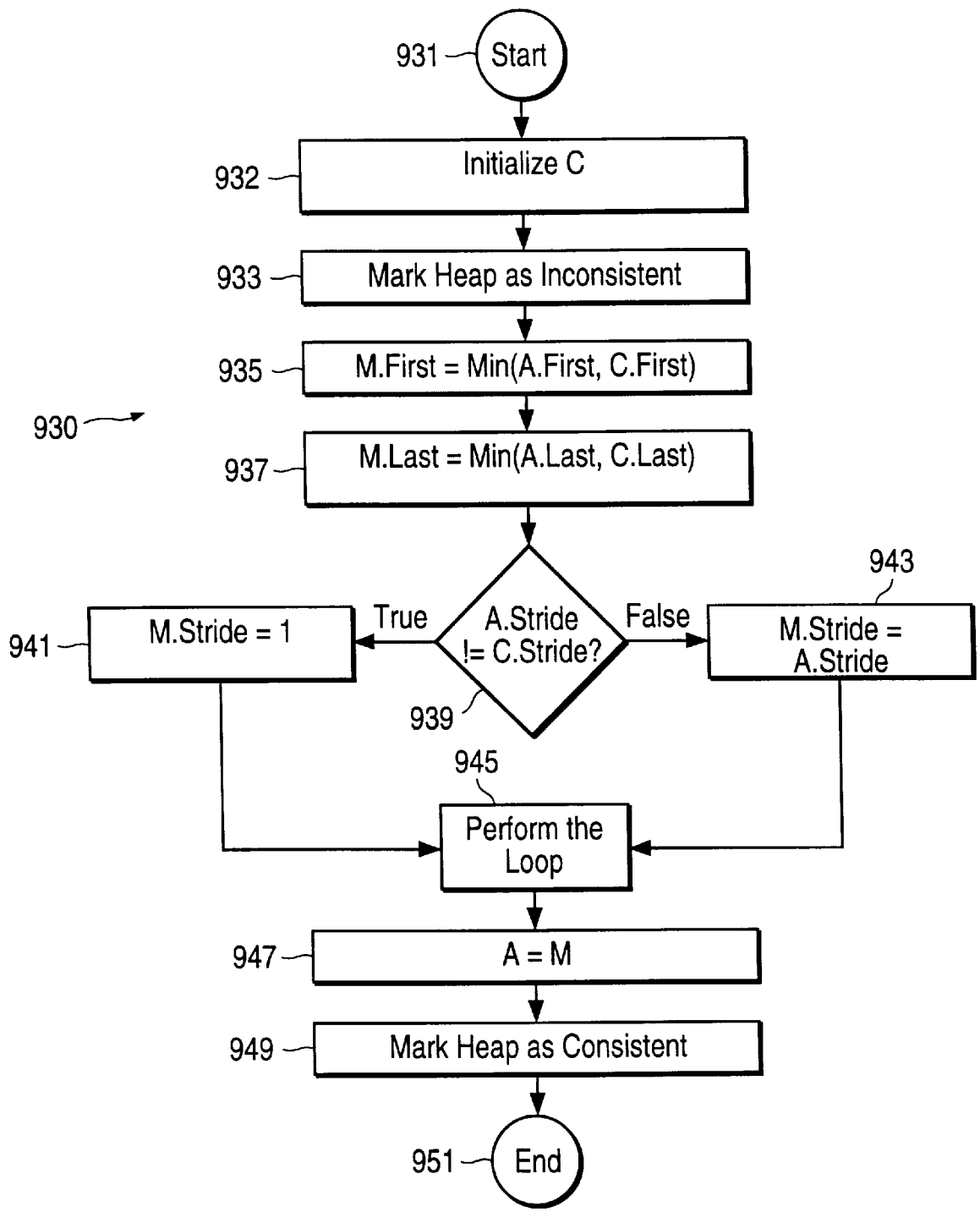
FIG. 9c illustrates a process used by an executing program to dynamically modify the array header for a loop that accesses a pointer array structure in accordance with an embodiment of the present invention.

FIG. 9c illustrates a 'mark pointer array' process indicated by general reference character 930 used by an executing program to dynamically modify the array header 911 for a loop that accesses the pointer array structure 910. The initial conditions at entry to this process are that the pointer array structure 910 exists and that the array header 911 has been initialized and possibly modified by previous loop operations to the pointer array structure 910. The 'mark pointer array' process 930 uses three variables: an "A" variable that contains values of "A.First, A.Last, and A.Stride" obtained from the initial values of the array header 911; a "C" variable that contains values of "C.First, C.Last, and C.Stride" obtained from the current loop's pattern of pointer assignments; and a "M" variable that contains values of "M.First, M.Last, and M.Stride" that are the result of merging the "A" and "C" variables. The "A" variable is simply the array header 911. The "M" variable is eventually stored in the array header 911 during the 'mark pointer array' process 930.

The 'mark pointer array' process 930 initiates at a 'start' terminal 931 and continues to an 'initialize C' procedure 932. The 'initialize C' procedure 932 stores into variable "C" the starting index, the ending index, and the stride used by the current loop. A 'mark heap inconsistent' procedure 933 next marks the heap area containing the pointer array structure 910 as inconsistent. Marking the heap area as inconsistent inhibits the garbage collection process from attempting to scavenge the area while the loop executes. The 'mark heap inconsistent' procedure 933 also sets the card marker 907, after marking the heap as inconsistent, to indicate that a pointer location was modified in the pointer array structure 903 starting at the card 905. Next a 'set M.First' procedure 935 sets M.First to the minimum of A.First and C.First. Then a 'set M.Last' procedure 937 sets M.Last to the maximum of A.Last and C.Last. The 'mark pointer array' process 930 continues to a decision procedure 939 that detects whether the value of A.Stride is not equal to the value of C.Stride. If these values are not equal the 'mark pointer array' process 930 continues to a 'set M.Stride to 1' procedure 941 the initializes M.Stride to the value "one". Otherwise the 'mark pointer array' process 930 goes to a 'set M.Stride to A.Stride' procedure 943 that initializes M.Stride to the value of A.Stride. Regardless of whether the 'set M.Stride to 1' procedure 941 or the 'set M.Stride to A.Stride' procedure 943 is executed, the 'mark pointer array' process 930 continues to a loop procedure 945. The loop procedure 945 performs the loop operation on the pointer array structure 910. Next an 'update A' procedure 947 stores the modified values in the "M" variable back into the array header 911. One skilled in the art will understand that the 'update A' procedure 947 could have been executed prior to the execution of the loop procedure 945. Then a 'mark heap consistent' procedure 949 marks the heap as consistent so as to allow the garbage collection process to scavenge the area. Finally, the 'mark pointer array' process 930 completes through an 'end' terminal 951. One skilled in the art will understand that multiple loops having assignments of pointers to the pointer array structure 910 dynamically update the array header 911 thus parameterizing which elements in the array data area 912 are modified between scavenge operations.

Figure 9D:
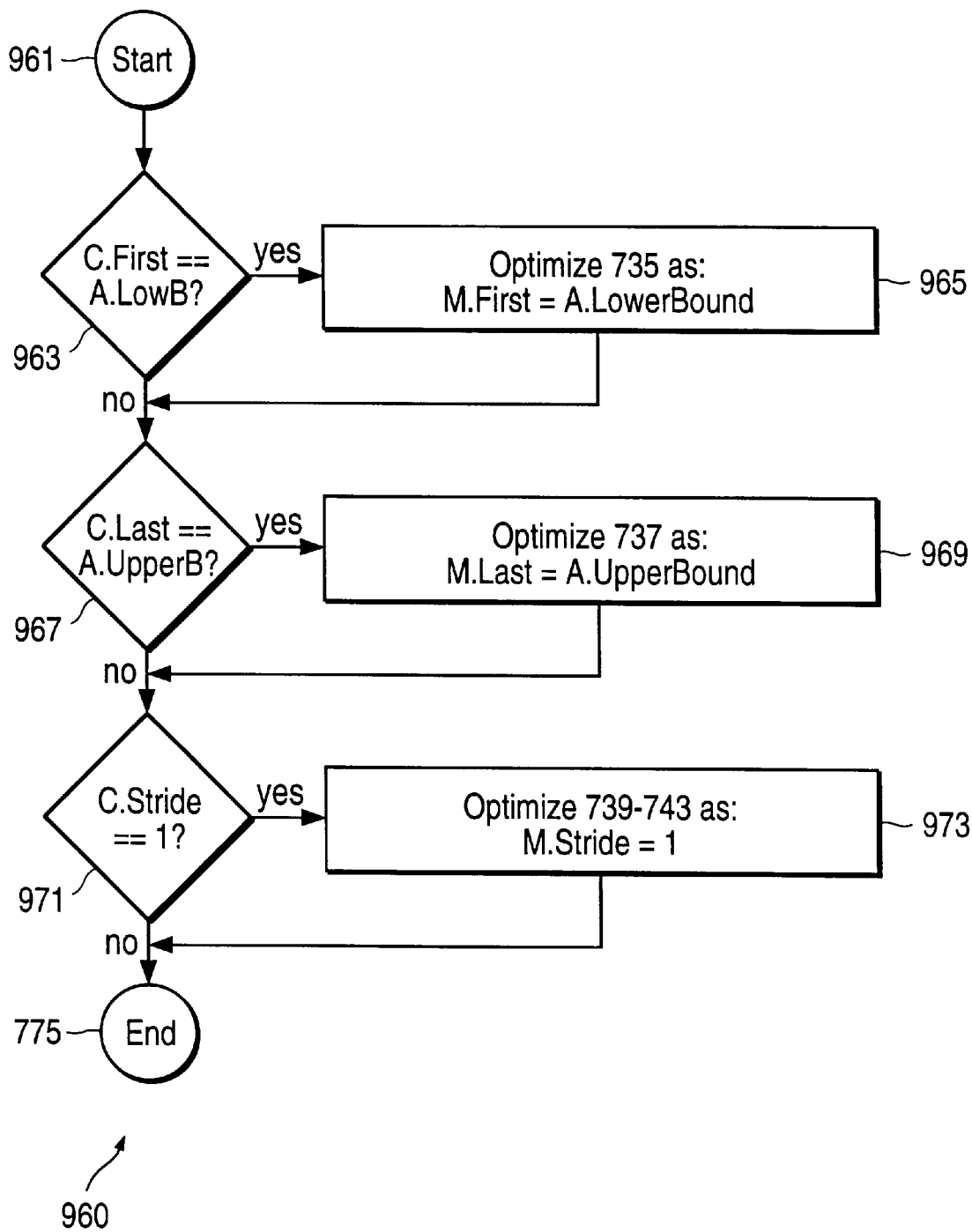
FIG. 9d illustrates a compiler optimization process in accordance with an embodiment of the present invention.

FIG. 9d illustrates a compiler optimization process indicated by general reference character 960. The compiler optimization process 960 executes during the optimization phase of a compiler. It modifies the 'mark pointer array' process 930 as described in FIG. 9c for some commonly used loops used for accessing an array having a lower bound and an upper bound. The loop has descriptors C.First, C.Last and C.Stride. The compiler optimization process 960 initiates at a 'start' terminal 961 and continues to a decision procedure 963 that compares C.First with the lower bound of the array being accessed (A.LowerBound). If the first element of the array accessed by the loop is the same as the first element of the array, the compiler optimization process 960 continues to an 'optimize step 735' procedure 965 that generates code for the target application that sets M.First to the array's lower bound (A.LowerBound) thus reducing the unoptimized minimum operation to a simple assignment. Regardless of the results of the decision procedure 963 the compiler optimization process 960 continues at a decision procedure 967 that compares C.Last with the upper bound of the array being accessed (A.UpperBound). If the last element of the array accessed by the loop is the same as the last element in the array, the compiler optimization process 960 continues to an 'optimize step 737' procedure 969 that generates code for the target application that sets M.Last to the array's upper bound (A.UpperBound) thus reducing the unoptimized maximum operation to a simple assignment. Regardless of the results of the decision procedure 967 the compiler optimization process 960 continues at a decision procedure 971 that compares C.Stride to the value one. If C.Stride is equal to the value one, the compiler optimization process 960 continues to an 'optimize step 739–743' procedure 973 that generates code for the target application that sets the value of M.Stride to the value one instead of using steps 739, 741, and 743 thus optimizing the 'mark pointer array' process 930. Regardless of the results of the decision procedure 971 the compiler optimization process 960 completes through an 'end' terminal 975.

Figure 9E:
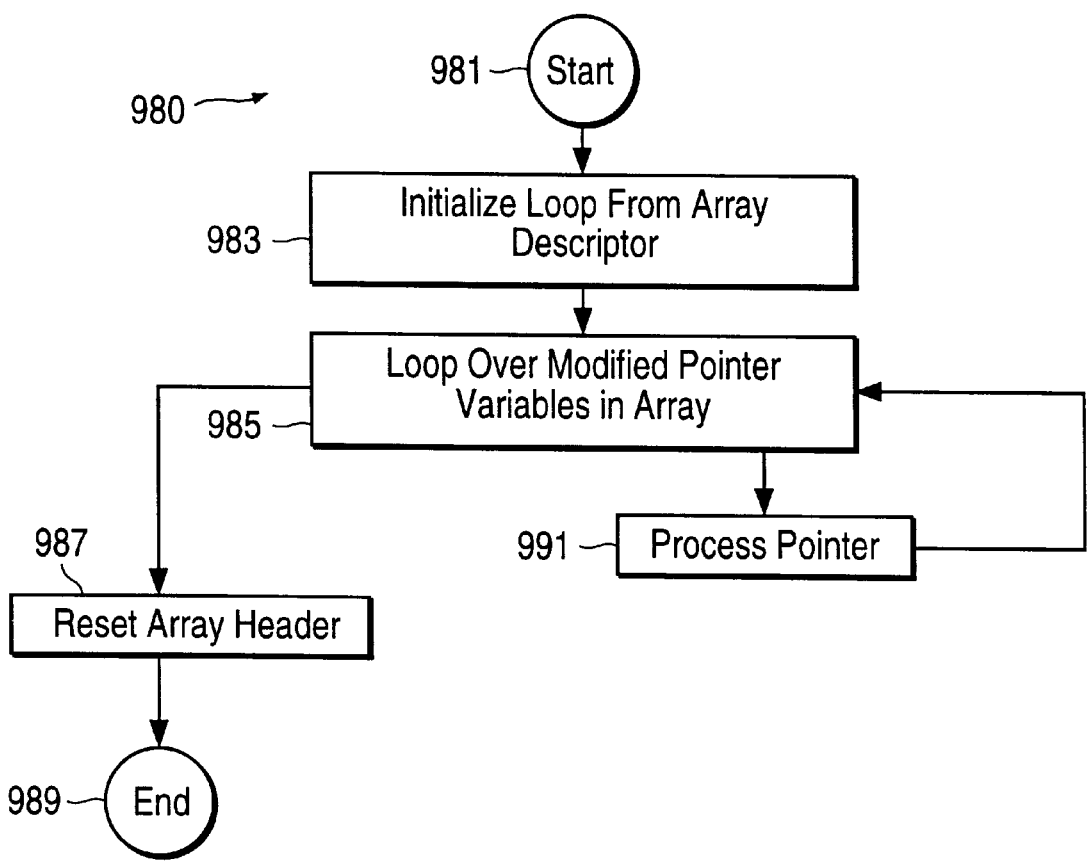
FIG. 9e illustrates an array scavenging process in accordance with an embodiment of the present invention.

FIG. 9e illustrates an array scavenge process indicated by general reference character 980. The array scavenge process 980 initiates at a 'start' terminal 981 when the garbage collection process has detected a card with a modified pointer array. The array scavenge process 980 receives a pointer to the pointer array structure 910 and continues to a 'initialize loop' procedure 983. The 'initialize loop' procedure 983 retrieves the information about the modified pointers in the pointer array structure 910 from the array header 911. Next, a 'loop over array' procedure 985 loops over the pointers specified by the array header 911. When the 'loop over array' procedure 985 completes the array scavenge process 980 continues to a 'reset array header' procedure 987 that resets the fields in the array header 911 to their initial state. At this time, the card marker 907 is also cleared to indicate that no unprocessed pointer modifications exist in the pointer array structure 910. The array scavenge process 980 then completes though an 'end' terminal 989. Each iteration of the 'loop over array' procedure 985 executes a 'process pointer' procedure 991 that processes the iterated pointer according to the needs of the garbage collection algorithm.

The card marking memory of a carded heap memory area is much smaller than the carded heap memory area itself. However, the overhead of scanning the card marking memory for a large carded heap memory can be very high. This overhead is reduced if only sections of the card marking memory need be scanned. One aspect of the invention associates the card marking memory into sections. These sections are flagged to indicate that a card marker controlled by the section has been marked. Only the card markers in the flagged sections are scanned.

Figure 10A:
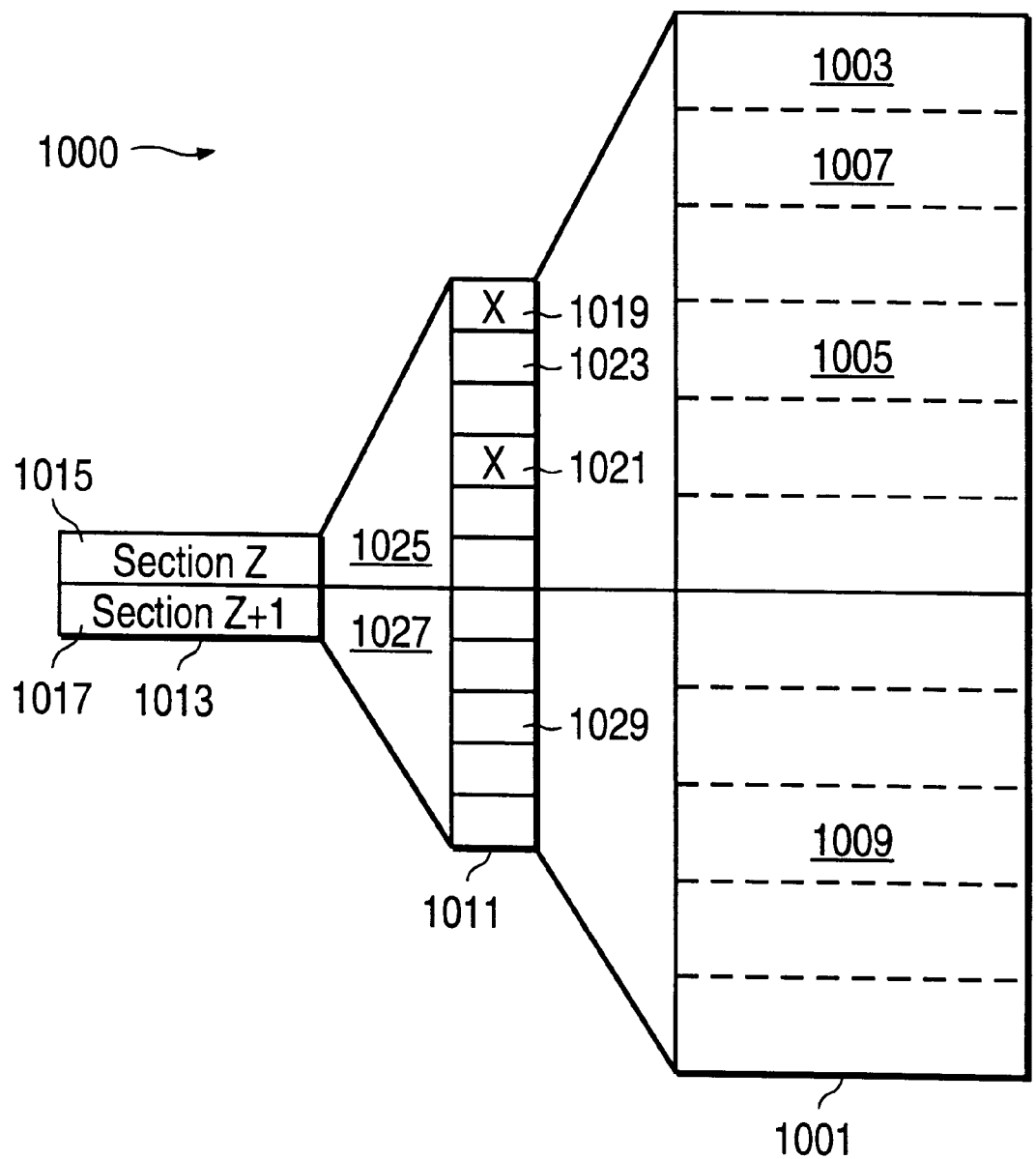
FIG. 10a illustrates a card marking structure containing a carded heap memory area including a plurality of cards in accordance with an embodiment of the present invention.

FIG. 10a illustrates a card marking structure indicated by general reference character 1000 including a carded heap memory area 1001 containing a plurality of cards 1003, 1005, 1007, 1009. The first modified card 1003 and the second modified card 1005 have been the target of a write operation subsequent to the last scavenge operation. The first unmodified card 1007 and the second unmodified card 1009 have not had a write operation subsequent to the last scavenge. The carded heap memory area 1001 is associated with a card vector 1011 that is the card marking memory. In turn, the card vector 1011 is associated with a section vector 1013. The section vector 1013 includes a 'section 'Z'' entry 1015 and a 'section 'Z+1'' entry 1017.

The card vector 1011 includes a first marked card marker 1019, a second marked card marker 1021 and a first unmarked card marker 1023. The first marked card marker 1019 is associated with the first modified card 1003. The second marked card marker 1021 is associated with the second modified card 1005. The first unmarked card marker 1023 is associated with the first unmodified card 1007.

The 'section 'Z'' entry 1015 is associated with a 'section 'Z'' portion 1025 of the card vector 1011. The 'section 'Z+1'' entry 1017 is associated with a 'section 'Z+1'' portion 1027 of the card vector 1011 that includes a second unmarked card marker 1029 that is associated with the second unmodified card 1009.

Thus, assuming that the carded heap memory area 1001 is $2^{26}$ words in size and that each card is $2^8$ words in size, the card vector 1011 would be $2^{18}$ bytes in size. Assuming that each section in the section vector 1013 covers $2^{12}$ bytes only $2^6$ sections are needed to cover the carded heap memory area 1001. Thus, in circumstances where the carded heap memory area 1001 is organized so that memory that is likely to be modified is localized together, significant processing time can be saved by first scanning the section vector 1013 for sections that are flagged to indicate that a card associated with the section is marked.

Figure 10B:
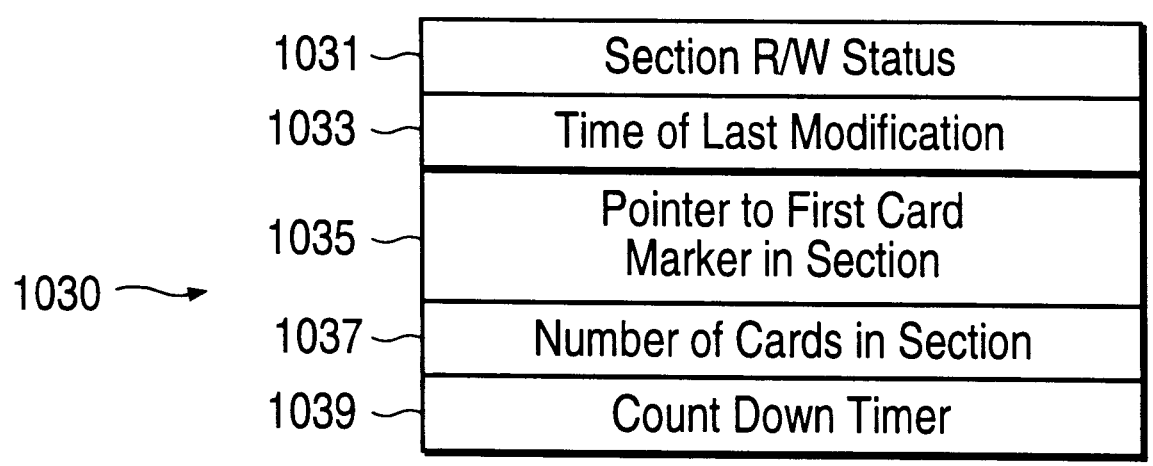
FIG. 10b illustrates a section structure in accordance with an embodiment of the present invention.

FIG. 10b illustrates a section structure indicated by general reference character 1030. The section structure 1030 is associated with each section (such as the 'section 'Z'' entry 1015) in the section vector 1013. A 'section R/W status' field 1031 contains the read-write status of the section. The contents of the 'section R/W status' field 1031 is either read-write or read-only. The 'section R/W status' field 1031 contains a read-only status if the contents of the carded heap memory area 1001 associated with the portion of the card vector 1011 for the section is believed to rarely reference the creation area. This read-only attribute is associated with hardware supported read-only protection to the portion of the card vector 1011 controlled by the section structure 1030. Thus, when a write-barrier attempts to mark a card during a write-operation into the carded memory, the write-operation to the card marker is trapped by the hardware. The hardware then raises a memory access fault. As subsequently described, the invention is notified of the write attempt, performs operations on the section structure 1030, marks the 'section R/W status' field 1031 as read-write and enables write access to the portion of the card vector 1011 controlled by the section structure 1030. The garbage collection process scans the section vector 1013 for those sections with the 'section R/W status' field 1031 containing a read-write status. If the 'section R/W status' field 1031 contains a read-only status, the garbage collection process does not examine the portion of the card vector 1011 controlled by the section structure 1030—thus saving time during the garbage collection process. The section structure 1030 also includes a 'last modified time' field 1033 that indicates when the memory associated with the section structure 1030 was last modified. In a preferred embodiment of the invention, the 'last modified time' field 1033 is relative to scavenge cycles. A 'pointer to first card in section' field 1035 is a pointer to the first card marker in the card vector 1011 that is associated with the section structure 1030. A 'number of cards in section' field 1037 contains the number of cards controlled by the section structure 1030. A 'count down timer' field 1039 contains a count-down timer that is decremented after every scavenge operation.

Figure 10C:
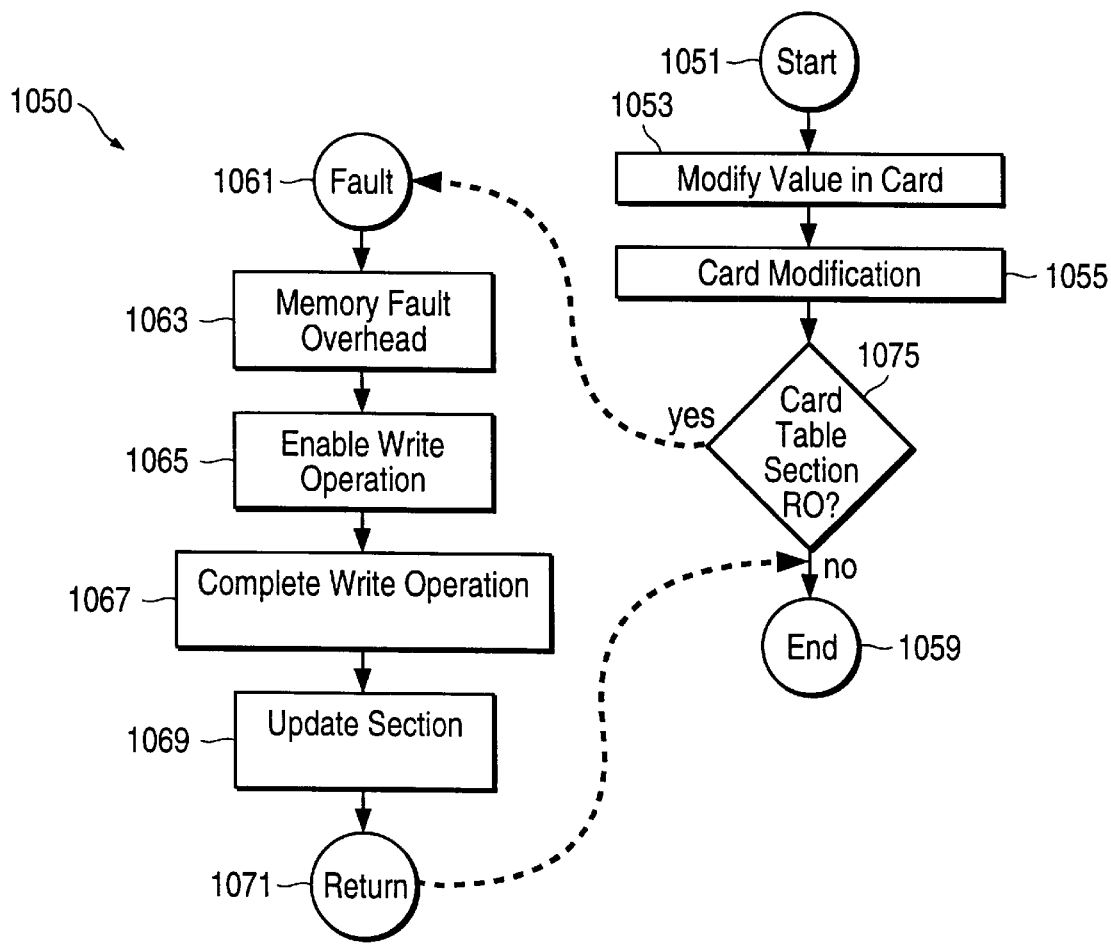
FIG. 10c illustrates a "mark section" process in accordance with an embodiment of the present invention.

FIG. 10c illustrates a 'mark section' process indicated by general reference character 1050. The 'mark section' process 1050 initiates at a 'start' terminal 1051 and continues to a 'memory modification' procedure 1053 that modifies a memory location in a card. As part of the write-barrier, the 'mark section' process 1050 attempts to update the card vector 1011 at a 'card modification' procedure 1055. If the card marker in the card vector 1011 is read-write, a 'memory protection' process 1057 allows the write operation to complete—thus marking the card marker. Next, the 'mark section' process 1050 completes through an 'end' terminal 1059. However, if the card marker in the card vector 1011 is read-only, the 'memory protection' process 1057 detects the prohibited write operation and raises a fault. The fault processing initiates at a 'fault' terminal 1061 and continues to a 'memory fault overhead' procedure 1063 that executes fault overhead related procedures. Then, an 'enable write operation' procedure 1065 changes the protection for the portion of the card vector 1011 that contains the target card marker to read-write from read-only. Next, a 'complete write operation' procedure 1067 completes the previously faulted write operation to the card marker. Then, an 'update section structure' procedure 1069 updates the 'section R/W status' field 1031 to indicate that the section structure 1030 is dirty and must be scanned during the next scavenge operation. Finally, the fault processing completes through a 'return' terminal 1071 and the 'mark section' process 1050 completes through the 'end' terminal 1059.

Figure 10D:
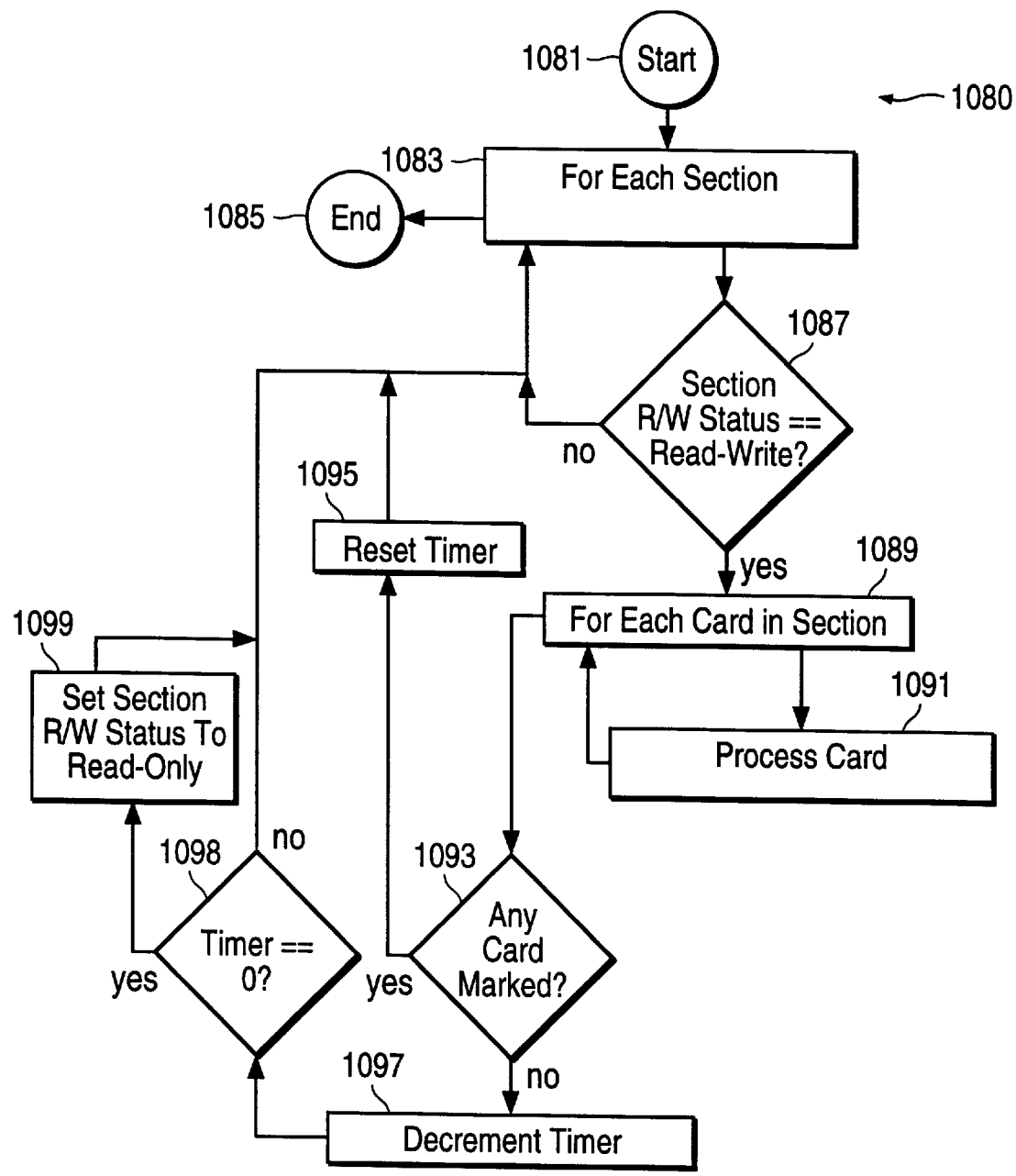
FIG. 10d illustrates a "collect section" process in accordance with an embodiment of the present invention.

FIG. 10d illustrates a 'collect section' process indicated by general reference character 1080. The 'collect section' process 1080 initiates at a 'start' terminal 1081 and continues to an iterative procedure 1083. The iterative procedure 1083 iterates over all sections in the section vector 1013. Once the last section in the section vector 1013 is processed, the 'collect section' process 1080 completes through an 'end' terminal 1085. During each iteration of the iterative procedure 1083, a decision procedure 1087 determines whether the 'section R/W status' field 1031 is read-write instead of read-only. If the 'section R/W status' field 1031 is not read-write the 'collect section' process 1080 advances to the next iteration of the iterative procedure 1083 ignoring each card marker in the portion of the card vector 1011. However, if the 'section R/W status' field 1031 is read-write, the process continues to an iterative procedure 1089 that iterates over each card marker in the portion of the card vector 1011 controlled by the iterated section. Each card is processed by a 'process card' procedure 1091 to perform the scavenge related operation on that iterated card. During this processing a flag is set if any card marker in the section is marked. Once all the cards in the iterated section are operated on, the process continues to a decision procedure 1093 that determines whether any card marker in the iterated section was marked. If any card marker was marked the 'collect section' process 1080 continues to a 'reset timer' procedure 1095 that resets the 'count down timer' field 1039 and places the current scavenge operation time in the 'last modified time' field 1033 of the section structure 1030. Next the 'collect section' process 1080 continues to the iterative procedure 1083 to process the next section. However, if at the decision procedure 1093 no card marker in the iterated section was marked, the 'collect section' process 1080 continues to a 'decrement timer' procedure 1097 that decrements the value stored in the 'count down timer' field 1039. Next at a 'timer check decision' procedure 1098 the value of the 'count down timer' field 1039 is tested for zero. If the 'count down timer' field 1039 is not zero the 'collect section' process 1080 continues to the iterative procedure 1083 to process the next section. If the 'count down timer' field 1039 is zero, a 'set section read-only' procedure 1099 sets the memory protection hardware to read-only so that attempted write operations on that section of the card vector 1011 will cause a fault. The 'set section read-only' procedure 1099 also sets the 'section R/W status' field 1031 of the current section structure to read-only. Next, the 'collect section' process 1080 continues to the iterative procedure 1083 to process the next section structure.

One skilled in the art will understand that the invention as previously described teaches a method, system, apparatus and programming product that provides both a data structure that can be simply scanned for pointer values and one that simplifies aspects of instantiated objects in an OOP environment.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for optimizing a garbage collection operation on a plurality of pointer values in a pointer array in a card-marked heap, said pointer array having a plurality of elements, wherein said method comprises steps of:

(a) parameterizing said pointer array dependent on a programmed loop operation resulting in a pointer data parameterization specifying a pattern of pointer assignments associated with said pointer array;

(b) storing, within said programmed loop operation, said plurality of pointer values into said plurality of elements without marking said card-marked heap within said programmed loop operation; and (c) optimizing said garbage collection operation on said plurality of elements dependent on said pointer data parameterization.

2. The computer controlled method of claim 1 wherein said pointer data parameterization comprises a first changed element index specifying a first modified element in said pointer array, a last changed element index specifying a last modified element, and a stride value.

3. The computer controlled method of claim 1 wherein said pointer data parameterization is stored in an array header within said pointer array.

4. A computer controlled method for optimizing an assignment operation within a programmed loop operation to a plurality of elements in a pointer array in a card-marked heap, wherein said method comprises steps of:

(a) parameterizing said pointer array dependent on a programmed loop operation characterized by a current pointer data parameterization and an existing pointer data parameterization associated with said pointer array resulting in a modified pointer data parameterization being associated with said pointer array; and (b) storing, within said programmed loop operation, said plurality of pointer values into said plurality of elements without marking said card-marked heap within said programmed loop operation.

5. The computer controlled method of claim 4 wherein said existing pointer data parameterization, said current pointer data parameterization, and said modified pointer data parameterization each comprise a first changed element index specifying a first modified element in said pointer array, a last changed element index specifying a last modified element, and a stride value.

6. The computer controlled method of claim 5 wherein said existing pointer data parameterization and said modified pointer data parameterization are stored in an array header within said pointer array.

7. The computer controlled method of claim 4 further comprising disabling a garbage collection operation on said card-marked heap during step (b) and step (c).

8. The computer controlled method of claim 4 further comprising marking said pointer array in said card-marked heap.

9. The computer controlled method of claim 4 further comprising steps of:

(a) optimizing step (b), by a compiler, dependent on said current pointer data parameterization of a compile-time determinable loop and said pointer array's upper and lower bounds.

10. An apparatus having a central processing unit (CPU) and a memory coupled to said CPU for optimizing a garbage collection operation on a plurality of pointer values in a pointer array in a card-marked heap of said memory, said pointer array having a plurality of elements, said apparatus comprising:

a parameterization mechanism configured to parameterize said pointer array dependent on a programmed loop operation resulting in a pointer data parameterization specifying a pattern of pointer assignments associated with said pointer array;

a storage mechanism configured to store, within said programmed loop operation, said plurality of pointer values into said plurality of elements without marking said card-marked heap within said programmed loop operation; and an optimization mechanism configured to optimize said garbage collection operation on said plurality of elements dependent on said pointer data parameterization.

11. The apparatus of claim 10 wherein said pointer data parameterization comprises a first changed element index specifying a first modified element in said pointer array, a last changed element index specifying a last modified element, and a stride value.

12. The apparatus of claim 10 wherein said pointer data parameterization is stored in an array header within said pointer array.

13. An apparatus having a central processing unit (CPU) and a memory coupled to said CPU for optimizing an assignment operation within a programmed loop operation to a plurality of elements in a pointer array in a card-marked heap of said memory, comprising:

a parameterizing mechanism configured to parameterize said pointer array dependent on a programmed loop operation characterized by a current pointer data parameterization and an existing pointer data parameterization associated with said pointer array resulting in a modified pointer data parameterization being associated with said pointer array; and a storage mechanism configured to store, within said programmed loop operation, said plurality of pointer values into said plurality of elements without marking said card-marked heap within said programmed loop operation.

14. The apparatus of claim 13 wherein said existing pointer data parameterization, said current pointer data parameterization, and said modified pointer data parameterization each comprise a first changed element index specifying a first modified element in said pointer array, a last changed element index specifying a last modified element, and a stride value.

15. The apparatus of claim 14 wherein said existing pointer data parameterization and said modified pointer data parameterization are stored in an array header within said pointer array.

16. The apparatus of claim 13 further comprising a disabling mechanism configured to disable a garbage collection operation on said card-marked heap during operation of the parameterizing mechanism and the storage mechanism.

17. The apparatus of claim 13 further comprising a marking mechanism configured to mark said pointer array in said card-marked heap.

18. The apparatus of claim 13 further comprising:

an optimization mechanism in a compiler configured to optimize the parameterizing mechanism, the optimization mechanism dependent on said current pointer data parameterization of a compile-time determinable loop and said pointer array's upper and lower bounds.

19. A computer program product comprising:

a computer usable storage medium having computer readable code embodied therein for causing a computer to optimize a garbage collection operation on a plurality of pointer values in a pointer array in a card-marked heap of said memory, said pointer array having a plurality of elements, said computer readable code comprising:

computer readable program code devices configured to cause said computer to effect a parameterization mechanism configured to parameterize said pointer array dependent on a programmed loop operation resulting in a pointer data parameterization specifying a pattern of pointer assignments associated with said pointer array;

computer readable program code devices configured to cause said computer to effect a storage mechanism configured to store, within said programmed loop operation, said plurality of pointer values into said plurality of elements without marking said card-marked heap within said programmed loop operation; and computer readable program code devices configured to cause said computer to effect an optimization mechanism configured to optimize said garbage collection operation on said plurality of elements dependent on said pointer data parameterization.

20. The computer program product of claim 19 wherein said pointer data parameterization comprises a first changed element index specifying a first modified element in said pointer array, a last changed element index specifying a last modified element, and a stride value.

21. The computer program product of claim 19 wherein said pointer data parameterization is stored in an array header within said pointer array.

22. A computer program product comprising:

a computer usable storage medium having computer readable code embodied therein for causing a computer to optimize an assignment operation within a programmed loop operation to a plurality of elements in a pointer array in a card-marked heap of said memory, said computer readable code comprising:

computer readable program code devices configured to cause said computer to effect a parameterizing mechanism configured to parameterize said pointer array dependent on a programmed loop operation characterized by a current pointer data parameterization and an existing pointer data parameterization associated with said pointer array resulting in a modified pointer data parameterization being associated with said pointer array; and computer readable program code devices configured to cause said computer to effect a storage mechanism configured to store, within said programmed loop operation, said plurality of pointer values into said plurality of elements without marking said card-marked heap within said programmed loop operation.

23. The computer program product of claim 22 wherein said existing pointer data parameterization, said current pointer data parameterization, and said modified pointer data parameterization each comprise a first changed element index specifying a first modified element in said pointer array, a last changed element index specifying a last modified element, and a stride value.

24. The computer program product of claim 23 wherein said existing pointer data parameterization and said modified pointer data parameterization are stored in an array header within said pointer array.

25. The computer program product of claim 22 further comprising computer readable program code devices configured to cause said computer to effect a disabling mechanism configured to disable a garbage collection operation on said card-marked heap during operation of the parameterizing mechanism and the storage mechanism.

26. The computer program product of claim 22 further comprising computer readable program code devices configured to cause said computer to effect a marking mechanism configured to mark said pointer array in said card-marked heap.

27. The computer program product of claim 22 further comprising:

computer readable program code devices configured to cause said computer to effect an optimization mechanism in a compiler configured to optimize the parameterizing mechanism, the optimization mechanism dependent on said current pointer data parameterization of a compile-time determinable loop and said pointer array's upper and lower bounds.

* * * * *